US008848212B2

(12) United States Patent
Shimada

(10) Patent No.: US 8,848,212 B2
(45) Date of Patent: Sep. 30, 2014

(54) PRINTING SYSTEM, PRINTING APPARATUS, AND JOB PROCESSING METHOD

(75) Inventor: Bungo Shimada, Tokyo (JP)

(73) Assignee: Canon Kabushiki Kaisha (JP)

( * ) Notice: Subject to any disclaimer, the term of this patent is extended or adjusted under 35 U.S.C. 154(b) by 872 days.

(21) Appl. No.: 11/838,204

(22) Filed: Aug. 13, 2007

(65) Prior Publication Data

US 2008/0049251 A1 Feb. 28, 2008

(30) Foreign Application Priority Data

Aug. 25, 2006 (JP) ................................ 2006-229854

(51) Int. Cl.
*G06F 15/00* (2006.01)
*B42B 4/00* (2006.01)
*B42C 9/00* (2006.01)

(52) U.S. Cl.
CPC ................ *B42B 4/00* (2013.01); *B42C 9/0031* (2013.01)
USPC ........ 358/1.15; 358/1.13; 358/1.16; 358/1.17

(58) Field of Classification Search
USPC .............................. 358/1.15, 1.13, 1.16, 1.17
See application file for complete search history.

(56) References Cited

U.S. PATENT DOCUMENTS

| | | | | |
|---|---|---|---|---|
| 3,907,274 | A | 9/1975 | D'Amato et al. | |
| 5,547,178 | A | 8/1996 | Costello | |
| 5,583,617 | A | 12/1996 | Altrieth et al. | |
| 5,640,232 | A | 6/1997 | Miyake et al. | |
| 5,706,411 | A | 1/1998 | McCormick et al. | |
| 6,486,968 | B2 | 11/2002 | Nishikawa | |
| 7,072,052 | B1 * | 7/2006 | Tanahashi et al. | 358/1.1 |
| 7,202,964 | B2 * | 4/2007 | Christiansen | 358/1.15 |
| 7,567,844 | B2 | 7/2009 | Thomas et al. | |
| 2002/0026463 | A1 * | 2/2002 | Utsunomiya | 707/527 |
| 2002/0171864 | A1 | 11/2002 | Sesek | |
| 2003/0067618 | A1 | 4/2003 | Farrell et al. | |
| 2003/0098987 | A1 * | 5/2003 | Fiske | 358/1.13 |
| 2004/0061892 | A1 * | 4/2004 | Ferlitsch | 358/1.15 |

(Continued)

FOREIGN PATENT DOCUMENTS

| | | | |
|---|---|---|---|
| EP | 1130480 | A2 | 9/2001 |
| JP | 11147647 | A | 6/1999 |

(Continued)

OTHER PUBLICATIONS

Chinese Office Action dated Apr. 3, 2009 issued in Chinese Application No. 2007101387806, which corresponds to related U.S. Appl. No. 11/838,206.

(Continued)

*Primary Examiner* — Steven Kau
*Assistant Examiner* — Mark Milia
(74) *Attorney, Agent, or Firm* — Rossi, Kimms & McDowell, LLP

(57) ABSTRACT

A printing system has the first operation mode in which printing starts during processing of a target job, and the second operation mode in which printing starts upon completion of processing of the job. It is determined on the basis of the processing status of the job in the printing system whether to switch the operation mode to the first or second operation mode. The operation mode is controlled to switch between the first and second operation modes in accordance with the determination result.

7 Claims, 16 Drawing Sheets

(56) References Cited

U.S. PATENT DOCUMENTS

| | | | |
|---|---|---|---|
| 2004/0098148 | A1 | 5/2004 | Retlich et al. |
| 2004/0207153 | A1 | 10/2004 | Kida |
| 2005/0017426 | A1 | 1/2005 | Hirata et al. |
| 2005/0084277 | A1 | 4/2005 | Kushida et al. |
| 2005/0105117 | A1 | 5/2005 | Oh et al. |
| 2005/0105129 | A1 | 5/2005 | Takahashi |
| 2005/0141030 | A1 | 6/2005 | Tuchitoi et al. |
| 2005/0220475 | A1 | 10/2005 | Kasahara |
| 2006/0092432 | A1* | 5/2006 | Ferlitsch ........................ 358/1.1 |
| 2007/0019224 | A1 | 1/2007 | Okada et al. |
| 2007/0024891 | A1 | 2/2007 | Kim |
| 2007/0085263 | A1 | 4/2007 | Machida et al. |
| 2008/0055637 | A1 | 3/2008 | Hatakeyama |

FOREIGN PATENT DOCUMENTS

| | | | |
|---|---|---|---|
| JP | 2000-159416 | A | 6/2000 |
| JP | 2000-318913 | A | 11/2000 |
| JP | 2002-297356 | A | 10/2002 |
| JP | 2002362821 | A | 12/2002 |
| JP | 2003-054830 | A | 2/2003 |
| JP | 2003-228471 | A | 8/2003 |
| JP | 2003326810 | A | 11/2003 |
| JP | 2004-284826 | A | 10/2004 |
| JP | 2004-310746 | A | 11/2004 |
| JP | 2004-310747 | A | 11/2004 |
| JP | 2005-258151 | A | 9/2005 |
| JP | 2006-078747 | A | 3/2006 |

OTHER PUBLICATIONS

Related co-pending U.S. Appl. No. 11/838,205; Takeshi Namikata; "Printing System, Printing Apparatus, and Job Control Method", filed Aug. 13, 2007; Spec. pp. 1-54; Figs. 1-21.

Related co-pending U.S. Appl. No. 11/838,206; Masahiko Tominaga et al.; "Printing System and Control Method Therefor", filed Aug. 13, 2007; Spec. pp. 1-68, Figs. 1-23.

Related co-pending U.S. Appl. No. 11/838,207; Yuki Hatakeyama; "Printing System and Control Method Therefor", filed Aug. 13, 2007; Spec. 1-53; Figs. 1-30.

Japanese Office Action to corresponding JP 2006-223514, dated Nov. 25, 2011.

Japanese Office Action for JP 2006-223514, cited in related U.S. Appl. No. 11/838,206, IDS dated Jun. 22, 2012.

Japanese Office Action for JP 2006-223514, cited in related U.S. Appl. No. 11/838,206. Mail date Nov. 12, 2012.

* cited by examiner

FIG. 15

| NUMBER OF FEED-WAITING DATA | WAIT TIME |
|---|---|
| FOUR OR MORE PAGES | 0 SEC |
| THREE PAGES | 2 SEC |
| TWO PAGES | 4 SEC |
| ONE PAGE | 6 SEC |

FIG. 16

| PRINT DELIVERY LOCATION | WAIT ADDITION TIME |
|---|---|
| NO INLINE FINISHER | 0 SEC |
| LARGE-VOLUME STACKER | 2 SEC |
| GLUE BINDING APPARATUS | 3 SEC |
| SADDLE STITCHING APPARATUS | 4 SEC |

PRINTING SYSTEM, PRINTING APPARATUS, AND JOB PROCESSING METHOD

BACKGROUND OF THE INVENTION

1. Field of the Invention

The present invention relates to a printing system adapted to be able to execute first and second operations, a printing apparatus, and a job processing method.

2. Description of the Related Art

Recently, a POD (Print On Demand) printing system using an electrophotographic or inkjet printing apparatus has been proposed (see, e.g., patent reference 1: Japanese Patent Laid-Open No. 2004-310746, and patent reference 2: Japanese Patent Laid-Open No. 2004-310747).

In the POD environment, a printing apparatus receives PDL data or PDF file data to be printed from an external apparatus, and rasterizes the data into a bitmap image (raster image data) to be printed on the basis of the result of analyzing the data. The printer engine prints the rasterized bitmap image. In printing, the printer engine cannot continuously operate without stop depending on the printing environment, failing to efficiently process a plurality of jobs at high productivity.

For example, even when the printing apparatus can execute an operation mode in which rasterization processing and print processing by the printer engine are parallel-performed, print processing waits for data requiring a long rasterization time, and the printer engine stops. To the contrary, even when the printing apparatus can execute an operation mode in which print processing by the printer engine starts after the end of all rasterization processing, printing of many pages takes a long time until all pages are printed.

SUMMARY OF THE INVENTION

It is an object of the present invention to provide a convenient printing system adaptable not only to the office environment but also to the POD environment, a printing apparatus, and a job processing method.

It is another object of the present invention to provide a mechanism of minimizing intervention work by an operator that may occur in the POD environment due to the specifications of an image forming apparatus designed in consideration of only the office environment. It is still another object of the present invention to implement efficient work by reducing the workload of the operator.

It is still another object of the present invention to provide a mechanism capable of flexibly coping with various needs from various users as much as possible in consideration of various situations and use environments.

It is still another object of the present invention to provide a mechanism of increasing the productivity of a printing system by automatically executing print processing in a proper operation mode.

According to one aspect of the present invention, there is provided a printing system adapted to be able to execute a first operation and a second operation, the first operation being an operation that causes a printing apparatus to start printing of a job to be processed without waiting for completion of rasterizing print data of a last page of the job, the second operation being an operation that causes the printing apparatus to start printing of the job upon completion of rasterizing print data of the last page of the job, the system comprising: a controller adapted to determine, in accordance with a processing status of the job in the printing system, which of the first operation and the second operation is to be executed.

According to another aspect of the present invention, there is provided a printing apparatus in a printing system adapted to be able to execute a first operation and a second operation, the first operation being an operation that causes the printing apparatus to start printing of a job to be processed without waiting for completion of rasterizing print data of a last page of the job, the second operation being an operation that causes the printing apparatus to start printing of the job upon completion of rasterizing print data of the last page of the job, the apparatus comprising: a controller adapted to determine, in accordance with a processing status of the job in the printing system, which of the first operation and the second operation is to be executed.

According to still another aspect of the present invention, there is provided a job processing method for a printing system adapted to be able to execute a first operation and a second operation, the first operation being an operation that causes a printing apparatus to start printing of a job to be processed without waiting for completion of rasterizing print data of a last page of the job, the second operation being an operation that causes the printing apparatus to start printing of the job upon completion of rasterizing print data of the last page of the job, the method comprising: determining, in accordance with a processing status of the job in the printing system, which of the first operation and the second operation is to be executed.

Further features of the present invention will become apparent from the following description of exemplary embodiments with reference to the attached drawings.

BRIEF DESCRIPTION OF THE DRAWINGS

FIG. 15 is a table showing an example of a print wait time table based on the number of feed-waiting data that is adopted by the control unit 205 in the third control example; and FIG. 16 is a table showing a print wait time table based on the print delivery location.

DESCRIPTION OF THE EMBODIMENTS

The best mode for carrying out the present invention will be explained in detail below with reference to the accompanying drawings.

Figure 1:
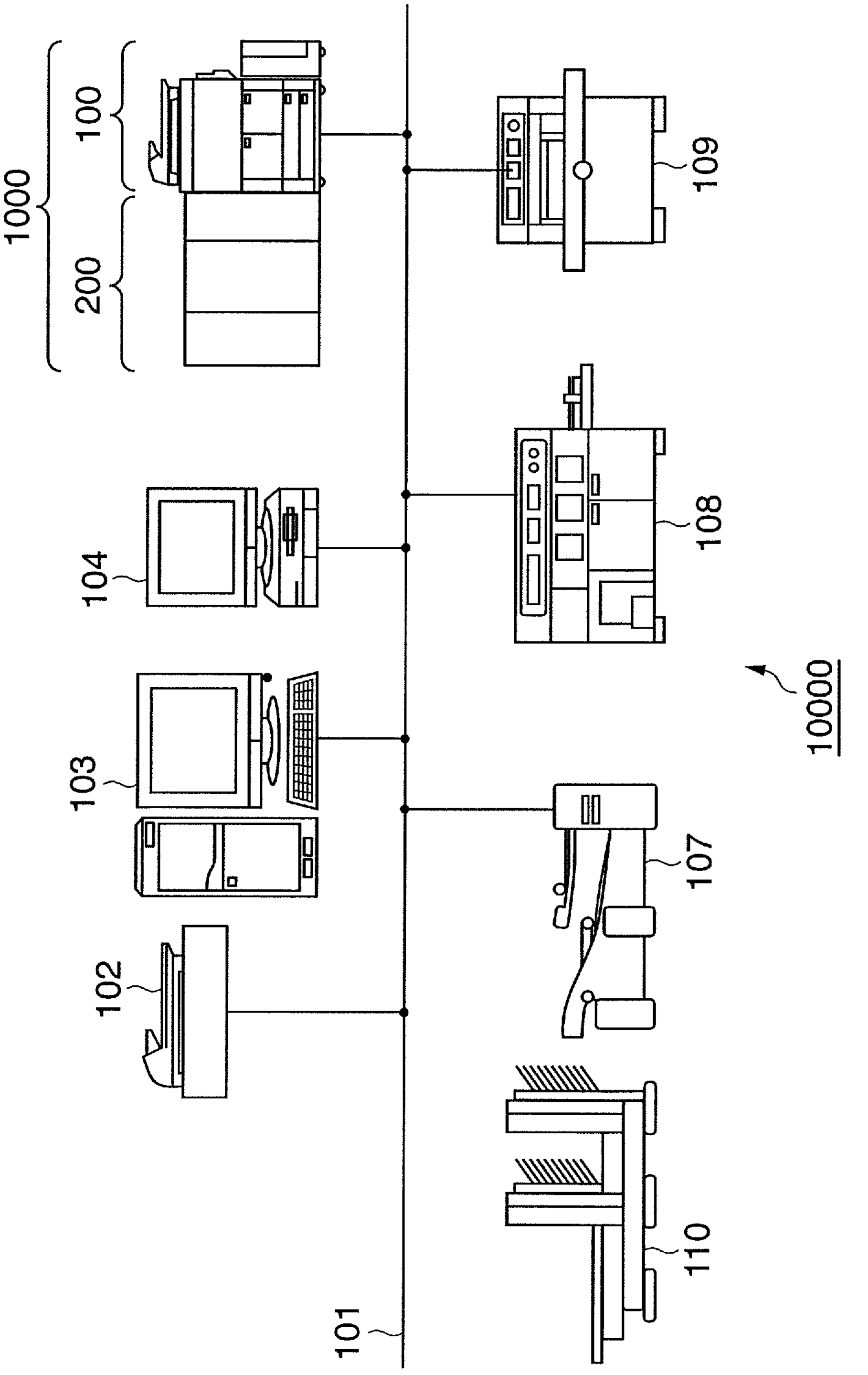
FIG. 1 is a view for explaining an overall configuration of a printing environment 10000 including a printing system 1000 to be controlled.

A POD system 10000 in FIG. 1 comprises a printing system 1000, scanner 102, server computer (PC) 103, and client computer (PC) 104, which are connected to each other via a network 101. Sheet processing apparatuses such as a paper folding apparatus 107, case binding apparatus 108, cutting apparatus 109, and saddle stitching apparatus 110 are also connected to the POD system 10000.

The printing system 1000 comprises a printing apparatus 100 and sheet processing apparatus 200. As an example of the printing apparatus 100, the embodiment will describe an MFP (Multi Function Peripheral) having a plurality of functions such as the copy and printer functions. However, the printing apparatus 100 may be a single function type printing apparatus having only the copy or printer function.

The server computer (PC) 103 manages data exchange with a variety of apparatuses connected to the network 101. The client computer (PC) 104 transmits image data to the printing apparatus 100 and PC 103 via the network 101. The paper folding apparatus 107 folds sheets printed by the printing apparatus 100. The case binding apparatus 108 case-binds sheets printed by the printing apparatus 100. The cutting apparatus 109 cuts a bundle of sheets printed by the printing apparatus 100. The saddle stitching apparatus 110 saddle-stitches sheets printed by the printing apparatus 100.

In the use of the paper folding apparatus 107, case binding apparatus 108, cutting apparatus 109, and saddle stitching apparatus 110, the user takes out sheets printed by the printing apparatus 100 from the printing system 1000, sets them in an apparatus for use, and causes the apparatus to process them. A plurality of apparatuses in the POD system 10000 of FIG. 1 except for the saddle stitching apparatus 110 are connected to the network 101 so as to communicate data with each other.

Sheet processing apparatuses are classified into three categories "inline finisher", "near-line finisher", and "offline finisher", and defined as follows. The "inline finisher" is defined as a sheet processing apparatus which satisfies both (condition 1) and (condition 2) listed below. The "near-line finisher" is defined as a sheet processing apparatus which satisfies only (condition 2). The "offline finisher" is defined as a sheet processing apparatus which satisfies neither (condition 1) nor (condition 2).

(Condition 1) The paper path (sheet feeding path) is physically connected to the printing apparatus 100 so as to directly receive sheets conveyed from the printing apparatus 100 without any operator intervention.

(Condition 2) A sheet processing apparatus is electrically connected to another apparatus so as to communicate data necessary for an operation instruction, status confirmation, or the like with another apparatus. More specifically, a sheet processing apparatus is electrically connected to the printing apparatus 100 so as to communicate data with it, or electrically connected to an apparatus (e.g., the PC 103 or 104) other than the printing apparatus 100 via the network 101 so as to communicate data with the apparatus. A sheet processing apparatus which satisfies either condition meets (condition 2).

That is, the sheet processing apparatus 200 corresponds to an "inline finisher". The paper folding apparatus 107, case binding apparatus 108, and cutting apparatus 109 correspond to "near-line finishers". The saddle stitching apparatus 110 corresponds to an "offline finisher".

The configuration of the printing system 1000 will be explained with reference to the system block diagram of FIG. 2.

Figure 2:
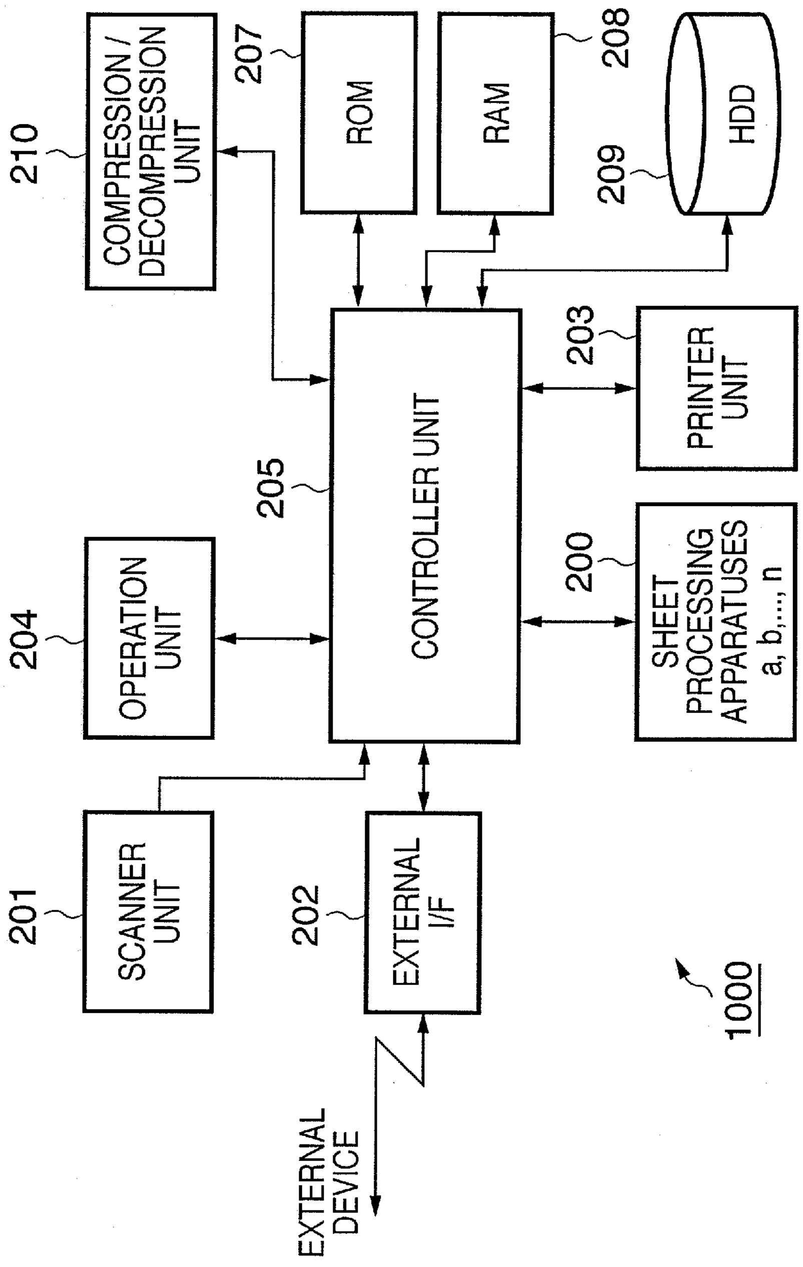
FIG. 2 is a block diagram for explaining a configuration of the printing system 1000 to be controlled.

The printing apparatus 100 incorporates units shown in FIG. 2 in the printing system 1000 except for the sheet processing apparatus 200. An arbitrary number of sheet processing apparatuses 200 are connectable to the printing apparatus 100.

The printing system 1000 is configured so that the sheet processing apparatus 200 connected to the printing apparatus 100 can execute sheet processing for sheets printed by the printing apparatus 100. It is also possible to form the printing system 1000 from only the printing apparatus 100 without connecting the sheet processing apparatus 200. The sheet processing apparatus 200 can communicate with the printing apparatus 100, and execute sheet processing (to be described later) upon receiving an instruction from the printing apparatus 100.

In the printing apparatus 100, a scanner unit 201 scans an image on a document, converts the image into image data, and transfers the image data to another unit. An external I/F 202 exchanges data with other apparatuses connected to the network 101. A printer unit 203 forms an image based on input image data, and prints it on a sheet. An operation unit 204 has a hard key input unit and touch panel, from which instructions from the user are accepted. The operation unit 204 provides various displays on its touch panel.

A control (controller) unit 205 comprehensively controls the processes and operations of various units in the printing system 1000. The control unit 205 also controls the operation of the printing apparatus 100 and that of the sheet processing apparatus 200 connected to the printing apparatus 100. A ROM 207 stores various programs to be executed by the control unit 205. For example, the ROM 207 stores programs to execute various processes of flowcharts to be described later, and display control programs to display various setup images to be described later. The ROM 207 further stores a program to cause the control unit 205 to interpret PDL (Page Description Language) code data received from the PC 103, PC 104, or the like and rasterize the PDL code data into raster image data. In addition, the ROM 207 stores a boot sequence, font information, and the like.

A RAM 208 stores image data sent from the scanner unit 201 and external I/F 202, various programs stored in the ROM 207, and setting information. The RAM 208 also stores information on the sheet processing apparatus 200 (e.g., information on the number of (0 to n) sheet processing apparatuses 200 connected to the printing apparatus 100, information on the function of each sheet processing apparatus, or the connection order of the sheet processing apparatuses).

An HDD (Hard Disk Drive) 209 includes a hard disk, and a drive unit which reads/writes data from/to the hard disk. The HDD 209 is a large-capacity storage device which stores image data input from the scanner unit 201 and external I/F 202 and compressed by a compression/decompression unit 210. The control unit 205 instructs the printer unit 203 to print image data stored in the HDD 209 based on an instruction from the user. The control unit 205 transmits image data stored in the HDD 209 to an external apparatus such as the PC 103 via the external I/F 202 based on an instruction from the user.

The compression/decompression unit 210 compresses/decompresses image data and the like stored in the RAM 208 and HDD 209 in accordance with various compression schemes such as JBIG and JPEG.

Figure 3:
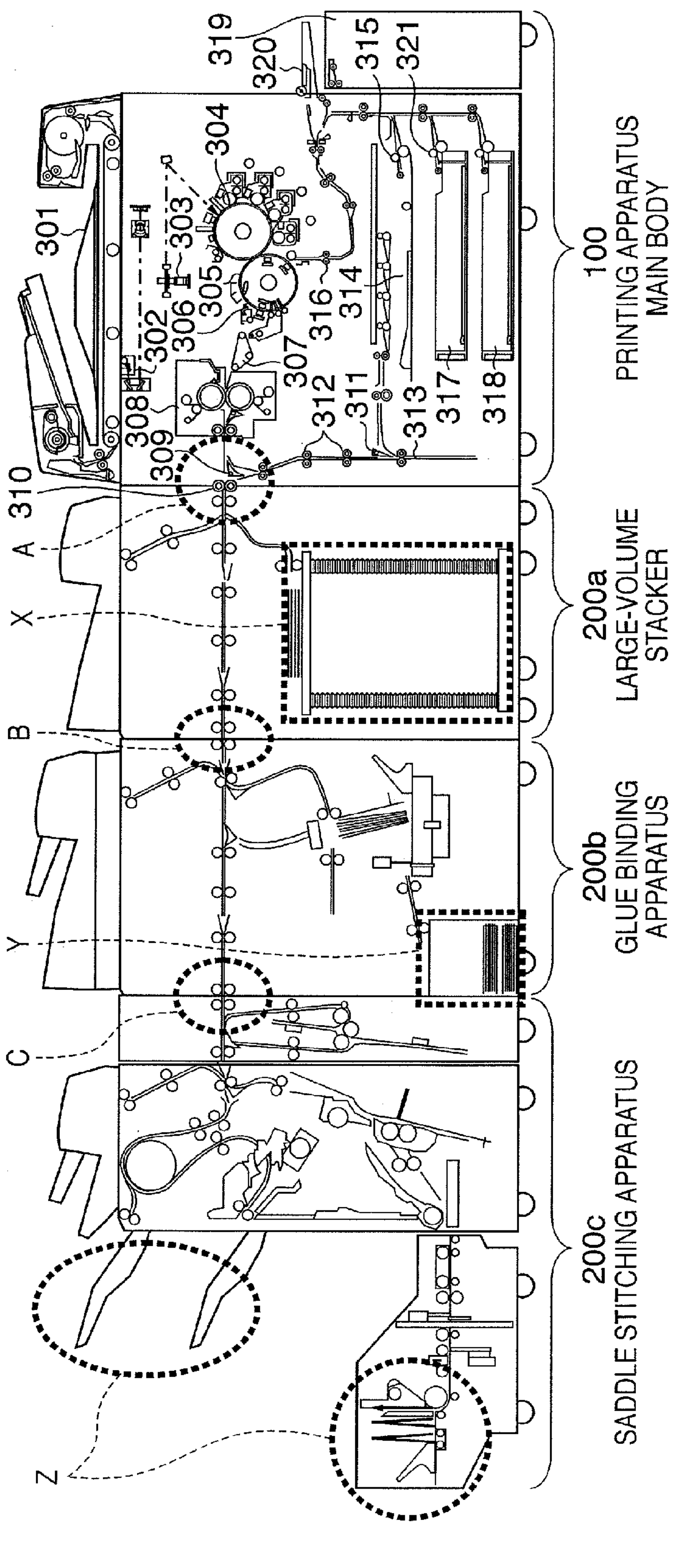
FIG. 3 is a side sectional view showing an internal configuration of the printing system 1000.

The configuration of the printing system 1000 will be explained with reference to FIG. 3. FIG. 3 is a side sectional view showing an internal configuration of the printing system 1000. The printing system 1000 is made up of the printing apparatus 100 and the sheet processing apparatus 200 connected to it.

The structure of the printing apparatus 100 will be explained first. An auto document feeder (ADF) 301 separates a document bundle on the support surface of the document tray sequentially in the order of pages from the first document sheet, and feeds each document sheet to the glass document table in order to scan the document sheet by a scanner 302.

The scanner 302 scans the image of the document sheet fed onto the glass document table, and converts the image into image data by a CCD. A rotary polygon mirror 303 receives a light ray (e.g., a laser beam) modulated in accordance with the image data, and irradiates a photosensitive drum 304 with the light ray as a reflected scan beam via a reflecting mirror. A latent image formed by the laser beam on the photosensitive drum 304 is developed with toner, and the toner image is transferred onto a sheet material on a transfer drum 305. A series of image forming processes is executed sequentially with yellow (Y), magenta (M), cyan (C), and black (K) toners, forming a full-color image. After four image forming processes, the sheet material bearing the full-color image is separated by a separation gripper 306 from the transfer drum 305, and conveyed to a fixing unit 308 by a pre-fixing conveyor 307. The fixing unit 308 has a combination of rollers and belts, and incorporates a heat source such as a halogen heater. The fixing unit 308 fuses and fixes, by heat and pressure, toner on a sheet material bearing a toner image. A delivery flapper 309 is swingable about the swing shaft, and regulates the sheet material conveyance direction. When the delivery flapper 309 swings clockwise in FIG. 3, a sheet material is conveyed straight, and discharged outside the apparatus by delivery rollers 310. The control unit 205 controls the printing apparatus 100 to execute single-sided printing according to this sequence.

To form images on the two surfaces of a sheet material, the delivery flapper 309 swings counterclockwise in FIG. 3, and the course of the sheet material changes to the downward direction to supply the sheet material to the double-sided conveyance section. The double-sided conveyance section has a reverse flapper 311, reverse rollers 312, a reverse guide 313, and a double-sided tray 314. The reverse flapper 311 swings about the swing shaft, and regulates the sheet material conveyance direction. To process a double-sided print job, the control unit 205 controls to swing the reverse flapper 311 counterclockwise in FIG. 3 to supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314. The double-sided tray 314 temporarily supports the sheet material, and a refeed roller 315 supplies the sheet material again to registration rollers 316. At this time, the sheet material is sent while a surface opposite to the first surface in the transfer process faces the photosensitive drum. The second image is formed on the second surface of the sheet by the same process as that described above. After the images are formed on the two surfaces of the sheet material, the sheet undergoes the fixing process and is discharged outside from the printing apparatus main body via the delivery rollers 310. The control unit 205 controls the printing apparatus 100 to execute double-sided printing according to this sequence.

The printing apparatus 100 comprises a paper feed section which stores sheets necessary for print processing. The paper feed section has paper feed cassettes 317 and 318 (each capable of storing, e.g., 500 sheets), a paper feed deck 319 (capable of storing, e.g., 5,000 sheets), and a manual feed tray 320. The paper feed cassettes 317 and 318 and the paper deck 319 allow setting sheets of different sizes and materials discriminatively in the respective paper feed units. The manual feed tray 320 also allows setting various sheets including a special sheet such as an OHP sheet. The paper feed cassettes 317 and 318, the paper deck 319, and the manual feed tray 320 respectively have paper feed rollers, which successively feed sheets one by one.

The sheet processing apparatuses 200 will be explained. Note that an arbitrary number of (maximum of five) sheet processing apparatuses 200 of arbitrary types are connectable as long as they can convey a sheet from an upstream apparatus to a downstream apparatus via the sheet feeding path. For example, a large-volume stacker 200*a*, glue binding apparatus 200*b*, and saddle stitching apparatus 200*c* are connected in the order named closer from the printing apparatus 100, and selectively available in the printing system 1000. Each sheet processing apparatus 200 has a sheet discharge portion, and the user can take out a processed sheet from the sheet discharge portion of the sheet processing apparatus.

The control unit 205 accepts, together with a print execution request via the operation unit 204, a request to execute sheet processing of a type desired by the user among sheet processing candidates of types executable by the sheet processing apparatuses 200 connected to the printing apparatus 100. Upon accepting a print execution request for a target job from the user via the operation unit 204, the control unit 205 causes the printer unit 203 to execute print processing necessary for the job. The control unit 205 controls to convey printed sheets of the job via the sheet feeding path to a sheet processing apparatus capable of executing sheet processing desired by the user. Then, the control unit 205 causes the sheet processing apparatus to execute the sheet processing.

Assume that a target job whose print execution request is accepted from the user requires large-volume stacking processing by the large-volume stacker 200*a* when the printing system 1000 has a system configuration shown in FIG. 3. This job is called a "stacker job".

When processing the stacker job in the system configuration of FIG. 3, the control unit 205 controls to convey sheets of the job printed by the printing apparatus 100 into the large-volume stacker via point A in FIG. 3. Then, the control unit 205 causes the large-volume stacker 200*a* to stack the sheets of the job. The control unit 205 causes the large-volume stacker 200*a* to hold the printed materials of the job stacked in the large-volume stacker 200*a* at delivery destination X inside the large-volume stacker 200*a* without conveying them to another apparatus (e.g., a succeeding apparatus).

The user can directly take out, from delivery destination X, the printed materials of the stacker job held at delivery destination X in FIG. 3. This can omit a series of apparatus operations and user operations to convey sheets to the most downstream delivery destination Z in the sheet conveyance direction in FIG. 3 and take out the printed materials of the stacker job from delivery destination Z.

Assume that a target job whose print execution request is accepted from the user requires sheet processing (e.g., glue binding of case binding or pad binding) by the glue binding apparatus 200*b* in the system configuration of FIG. 3. This job is called a "glue binding job".

When processing the glue binding job in the system configuration of FIG. 3, the control unit 205 controls to convey sheets printed by the printing apparatus 100 into the glue binding apparatus 200*b* via points A and B in FIG. 3. Then, the control unit 205 causes the glue binding apparatus 200*b* to bind the sheets of the job with glue. The control unit 205 causes the glue binding apparatus 200*b* to hold the printed materials of the job glue-bound by the glue binding apparatus 200*b* at delivery destination Y inside the glue binding apparatus 200*b* without conveying them to another apparatus (e.g., a succeeding apparatus).

Assume that a target job whose print execution request is accepted from the user requires sheet processing by the saddle stitching apparatus 200*c* in the system configuration of FIG. 3. The sheet processing by the saddle stitching apparatus 200*c* includes, for example, saddle stitching, punching, cutting, shift delivery, and folding. This job is called a "saddle stitching job".

When processing the saddle stitching job by the system configuration in FIG. 3, the control unit 205 controls to convey sheets of the job printed by the printing apparatus 100 into the saddle stitching apparatus 200*c* via points A, B, and C. Then, the control unit 205 causes the saddle stitching apparatus 200*c* to process the sheets of the job. The control unit 205 causes the saddle stitching apparatus 200*c* to hold the printed materials of the saddle stitching job at delivery destination Z in the saddle stitching apparatus 200*c*.

Delivery destination Z has a plurality of delivery destination candidates. This is because the saddle stitching apparatus can execute a plurality of types of sheet processes and the delivery destination changes in each sheet processing.

As described with reference to FIGS. 1 to 3, the printing system 1000 according to the embodiment allows connecting a plurality of sheet processing apparatuses to the printing apparatus 100. These sheet processing apparatuses can be arbitrarily combined and connected to the printing apparatus 100. The connection order of the sheet processing apparatuses can be freely changed as long as the sheet feeding paths of the sheet processing apparatuses link with each other. There is a plurality of types of sheet processing apparatus candidates connectable to the printing apparatus 100.

The internal structures of the sheet processing apparatuses connectable to the printing apparatus 100 will be explained for each type with reference to FIGS. 4 to 6.

The internal structure of the large-volume stacker will be explained with reference to the sectional view shown in FIG. 4. The large-volume stacker conveys a sheet from an upstream apparatus selectively to one of three feeding paths (escape path, stack path, and straight path).

The stack path in the large-volume stacker is a sheet feeding path for conveying sheets to the stack tray. The stack tray in FIG. 4 is a stacking unit mounted on an extensible stay. A demountable dolly supports the extensible stay from below it. With the dolly, the operator can carry sheets stacked on the stack tray.

Assume that the control unit 205 accepts a request from the user via the operation unit 204 to execute a job set to perform sheet stacking processing by the large-volume stacker. In this case, the control unit 205 conveys sheets printed by the printing apparatus 100 to the stack path of the large-volume stacker, and delivers them to the stack tray via the stack path.

Figure 4:
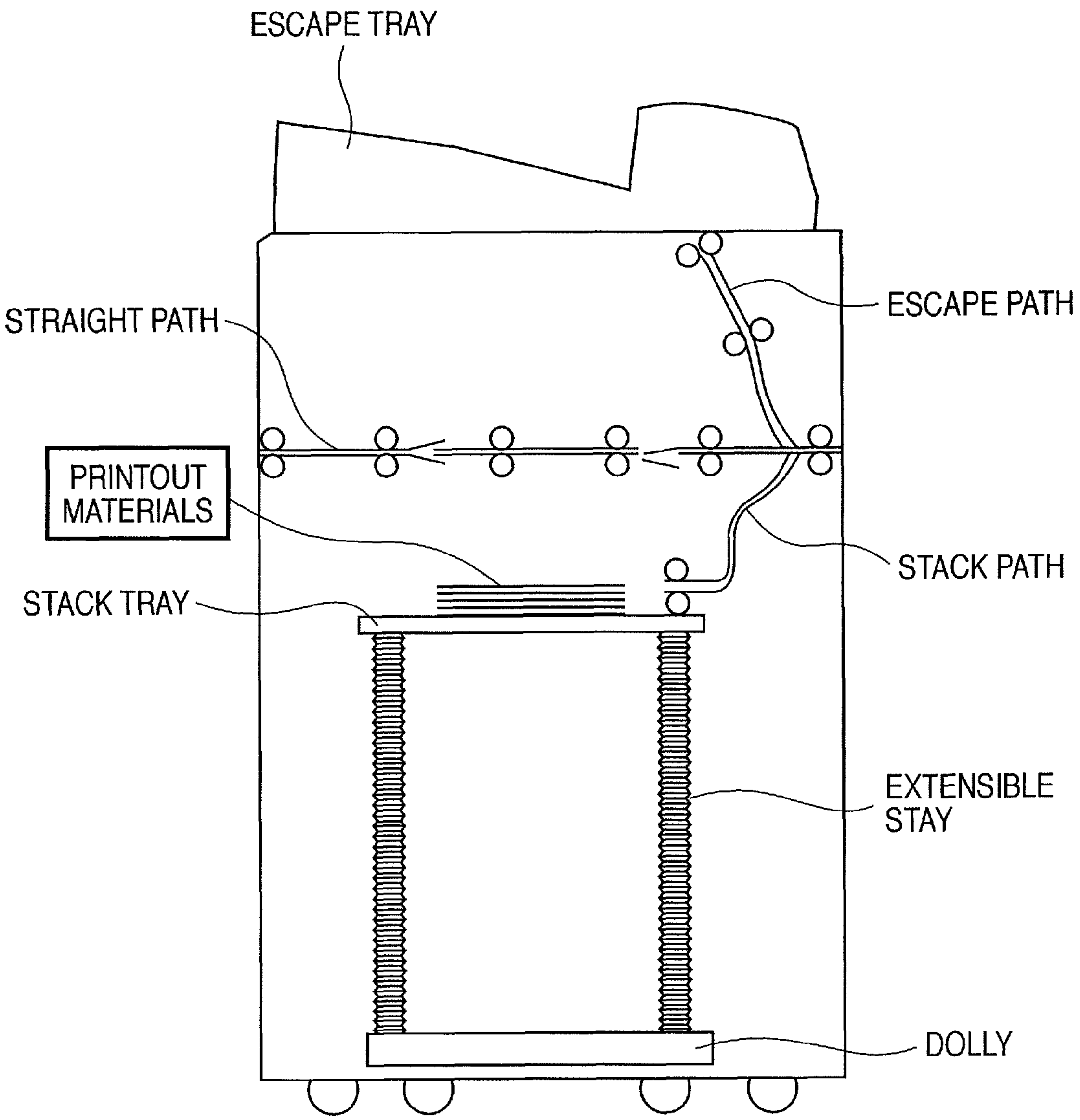
FIG. 4 is a side sectional view showing an internal structure of a large-volume stacker.

The straight path of the large-volume stacker shown in FIG. 4 is a sheet feeding path for conveying, to a succeeding apparatus, sheets of a job requiring no sheet stacking processing using the stack tray of the large-volume stacker.

The escape path is a sheet feeding path for discharging sheets to the escape tray (also called a sample tray). The escape path is used to output sheets without stacking them. For example, when confirming outputs (proof print), printed materials are conveyed to the escape path and can be taken out from the escape tray.

A plurality of sheet sensors necessary to detect the sheet conveyance status and paper jams is arranged on the sheet feeding path in the large-volume stacker.

The large-volume stacker comprises a CPU (not shown), and the CPU notifies the control unit 205 of sheet detection information from each sensor via a signal line for data communication. Based on the information from the large-volume stacker, the control unit 205 grasps the sheet conveyance status and paper jams in the large-volume stacker. When another sheet processing apparatus is connected between the large-volume stacker and the printing apparatus 100, the CPU (not shown) of the sheet processing apparatus notifies the control unit 205 of sensor information of the large-volume stacker.

The internal structure of the glue binding apparatus will be explained with reference to the sectional view shown in FIG. 5. The glue binding apparatus conveys a sheet from an upstream apparatus selectively to one of three feeding paths (cover path, main body path, and straight path).

The glue binding apparatus also has an inserter path. The inserter path is a sheet feeding path for conveying a sheet on the insertion tray to the cover path.

Figure 5:
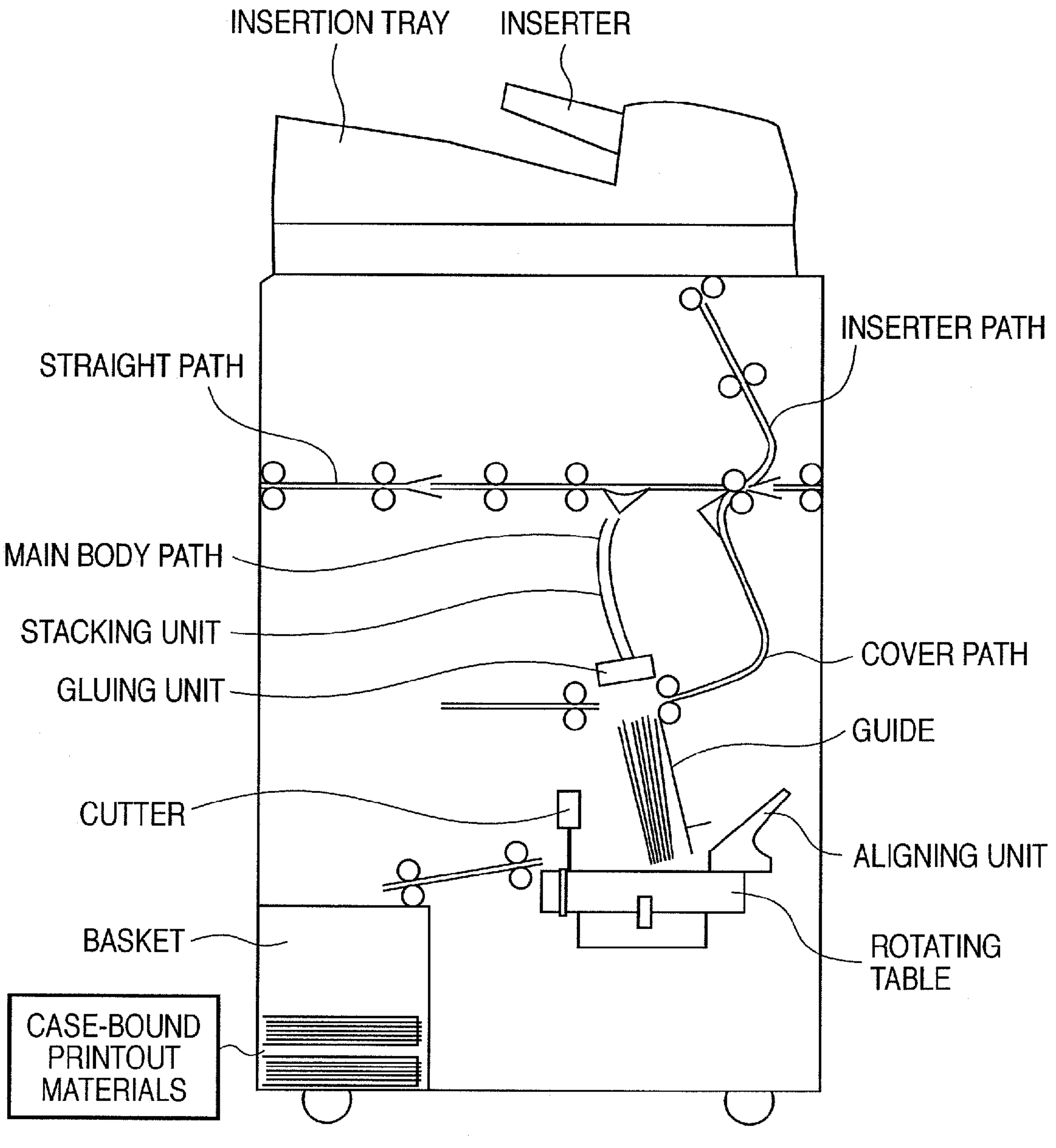
FIG. 5 is a side sectional view showing an internal structure of a glue binding apparatus.

The straight path of the glue binding apparatus in FIG. 5 is a sheet feeding path for conveying, to a succeeding apparatus, sheets of a job requiring no glue binding by the glue binding apparatus.

The main body path and cover path of the glue binding apparatus shown in FIG. 5 are sheet feeding paths for conveying sheets necessary to create case-bound printed materials.

For example, when creating case-bound printed materials using the glue binding apparatus, the control unit 205 causes the printer unit 203 to print image data of the body on sheets serving as the body of the case-bound printed materials. Case-bound printed materials of one booklet are created by wrapping a bundle of body sheets for one booklet with one cover. The body sheet bundle in case binding will be called a "main body".

The control unit 205 controls to convey sheets printed by the printing apparatus 100 to the main body path shown in FIG. 5. In case binding, the control unit 205 causes the glue binding apparatus to wrap the main body printed by the printing apparatus 100 with a cover sheet conveyed via the cover path.

For example, the control unit 205 causes the glue binding apparatus to sequentially stack main body sheets conveyed from an upstream apparatus on the stacking unit via the main body path in FIG. 5. After stacking sheets bearing body data on the stacking unit by the number of sheets of one booklet, the control unit 205 controls to convey one cover sheet necessary for the job via the cover path. The control unit 205 controls a gluing unit in FIG. 5 to glue the spine of the sheet bundle of one set corresponding to the main body. Then, the control unit 205 controls the gluing unit to bond the spine of the main body to the center of the cover. In bonding the main body to the cover, the main body is conveyed and pushed down in the apparatus. As a result, the cover is folded to wrap the main body with one cover. The sheet bundle of one set is stacked on a rotating table in FIG. 5 along the guide.

After the sheet bundle of one set is set on the rotating table in FIG. 5, the control unit 205 causes a cutter in FIG. 5 to cut the sheet bundle. At this time, the cutter can execute three-side cutting processing to cut three edges of the sheet bundle of one set other than an edge serving as the spine. The control unit 205 uses an aligning unit to push the sheet bundle having undergone three-side cutting processing toward a basket, putting the sheet bundle into the basket in FIG. 5.

The internal structure of the saddle stitching apparatus will be explained with reference to the sectional view shown in FIG. 6. The saddle stitching apparatus comprises various units for selectively executing stapling, cutting, punching, folding, shift delivery, saddle stitching, and the like for sheets from the printing apparatus 100. The saddle stitching apparatus does not have a straight path for conveying sheets to a succeeding apparatus. For this reason, the saddle stitching apparatus is connected last, as shown in FIG. 3, when connecting a plurality of sheet processing apparatuses to the printing apparatus 100.

Figure 6:
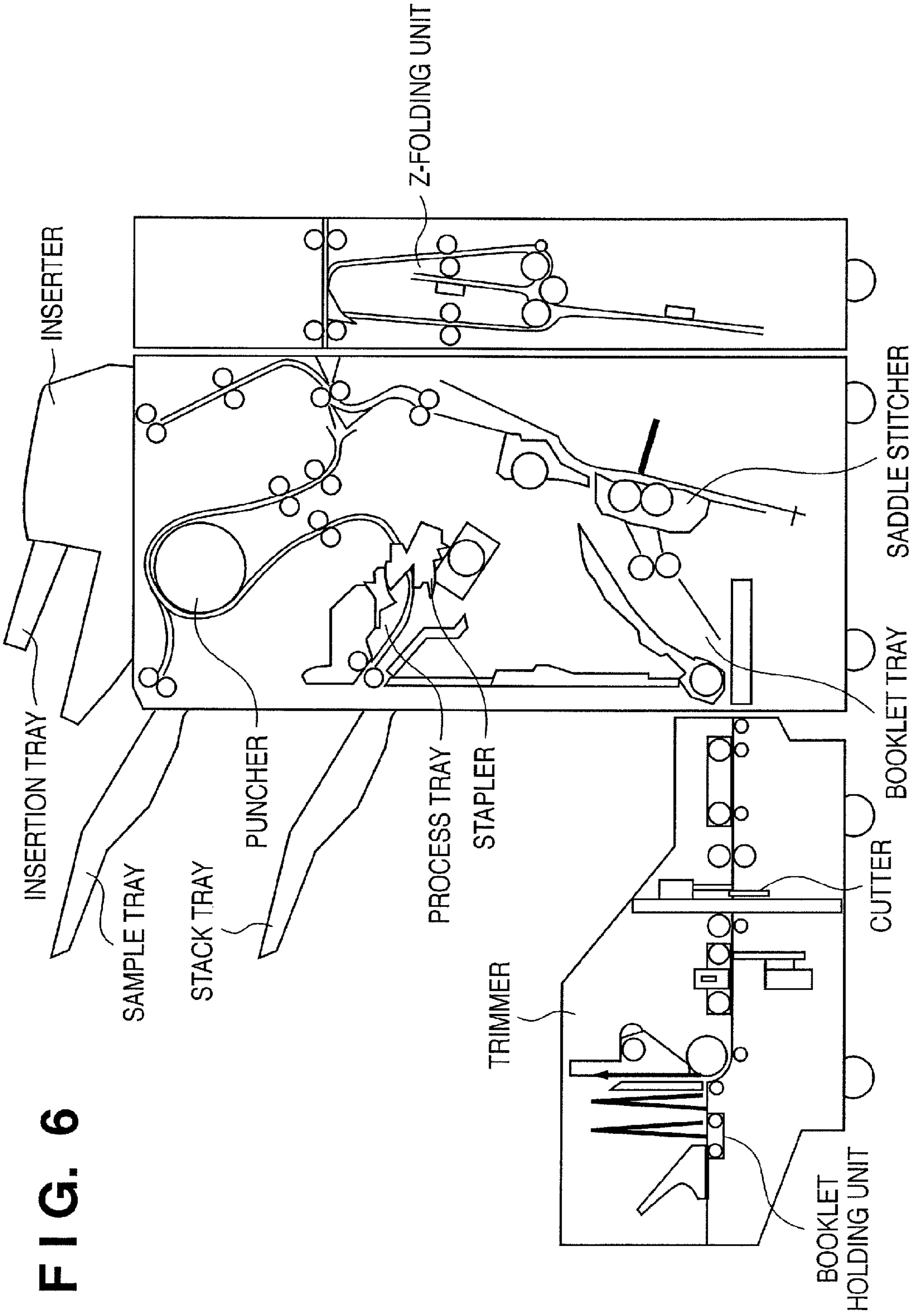
FIG. 6 is a side sectional view showing an internal structure of a saddle stitching apparatus.

As shown in FIG. 6, the saddle stitching apparatus has a sample tray and stack tray outside the apparatus, and a booklet tray inside the apparatus.

Upon accepting an instruction to staple sheets by the saddle stitching apparatus, the control unit 205 causes the saddle stitching apparatus to sequentially stack sheets printed by the printing apparatus 100 on the process tray inside the saddle stitching apparatus. After stacking sheets of one bundle on the process tray, the control unit 205 causes a stapler to staple them. The control unit 205 causes the saddle stitching apparatus to discharge the stapled sheet bundle from the process tray to the stack tray in FIG. 6.

When executing a job for which the control unit 205 accepts an instruction to Z-fold sheets by the saddle stitching apparatus, the control unit 205 causes a Z-folding unit to Z-fold sheets printed by the printing apparatus 100. The control unit 205 controls to make the folded sheets pass through the saddle stitching apparatus and deliver them to a discharge tray such as the stack tray or sample tray.

Upon accepting an instruction to perform punching by the saddle stitching apparatus, the control unit 205 causes a puncher to punch sheets printed by the printing apparatus 100. The control unit 205 controls to make the punched sheets pass through the saddle stitching apparatus and deliver them onto a discharge tray such as the stack tray or sample tray.

When executing a job for which the control unit 205 accepts an instruction to saddle-stitch sheets by the saddle stitching apparatus, the control unit 205 causes a saddle stitcher to stitch a bundle of sheets by one set at two center portions. The control unit 205 causes the saddle stitcher to clamp the sheet bundle at the center by rollers and fold the sheets into two at the center, thereby creating a booklet such as a brochure. The sheet bundle saddle-stitched by the saddle stitcher is conveyed onto the booklet tray.

Upon accepting a cutting instruction for a job for which the control unit 205 accepts an instruction to saddle-stitch sheets, the control unit 205 controls to convey a saddle-stitched sheet bundle from the booklet tray to a trimmer. The control unit 205 causes a cutter to cut the sheet bundle conveyed to the trimmer, and a booklet holding unit to hold the sheet bundle. The saddle stitching apparatus in FIG. 6 can also cut three edges of a saddle-stitched sheet bundle.

When the saddle stitching apparatus does not have any trimmer, the operator can take out a sheet bundle bound by the saddle stitcher from the booklet tray.

The saddle stitching apparatus can also attach a sheet (e.g., a cover sheet printed in advance) set on the insertion tray in FIG. 6 to a sheet printed by the printing apparatus 100 and conveyed from it.

Figure 7:
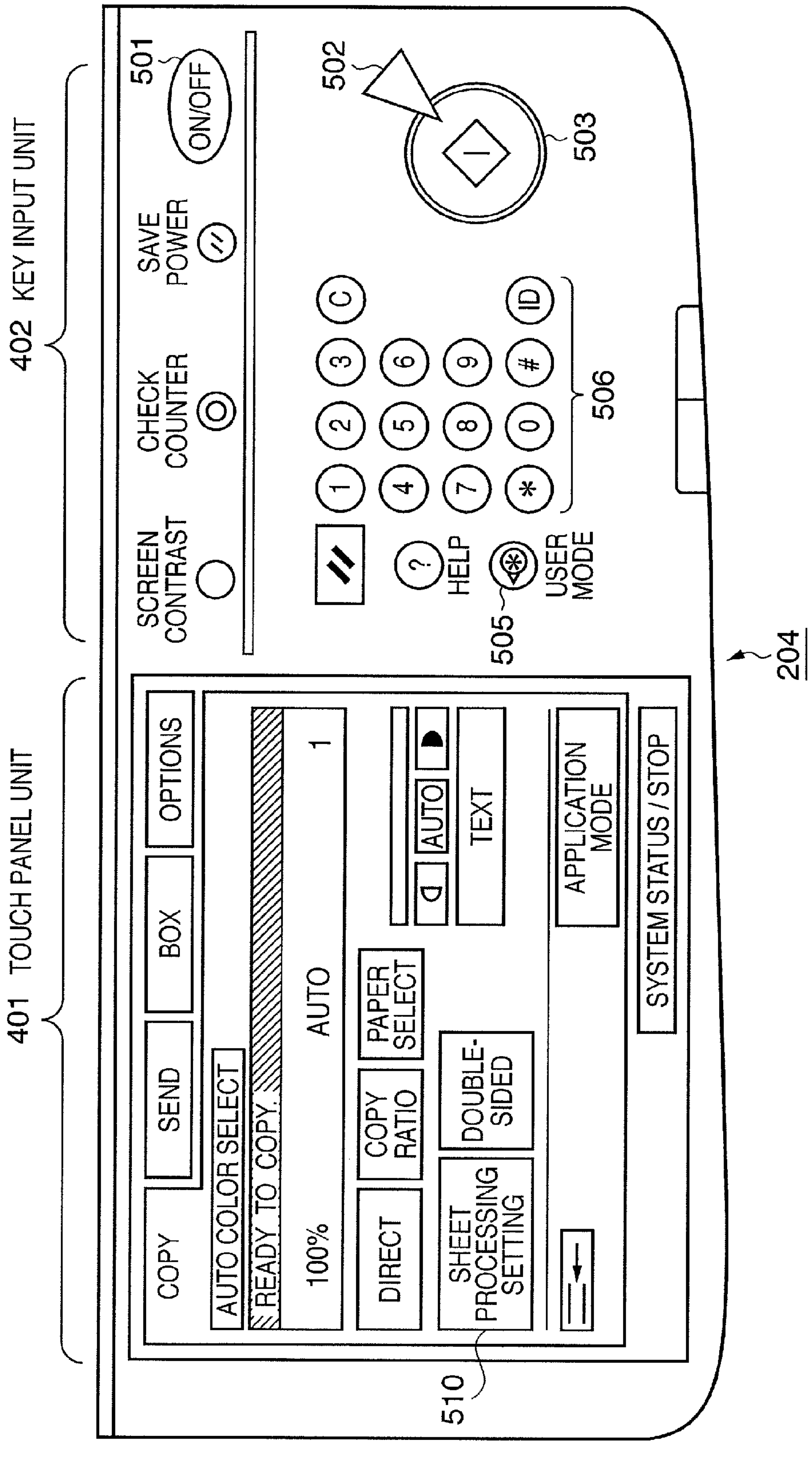
FIG. 7 is a view showing an arrangement of an operation unit 204.

The arrangement of the operation unit 204 will be described with reference to FIG. 7. The operation unit 204 comprises a touch panel unit 401 and key input unit 402. The touch panel unit 401 is formed from an LCD (Liquid Crystal Display) and a transparent electrode adhered onto the LCD, and displays various setup windows for accepting an instruction from the user. The touch panel unit 401 has both a function of displaying various windows and an instruction input function of accepting an instruction from the user. The key input unit 402 comprises a power key 501, start key 503, stop key 502, user mode key 505, and numerical keypad 506. The start key 503 is used to cause the printing apparatus 100 to start a copy job and send job. The numerical keypad 506 is used to set a numerical value such as the number of copies.

The control unit 205 controls the printing system 1000 to perform various processes based on user instructions accepted via various windows displayed on the touch panel unit 401 and user instructions accepted via the key input unit 402.

Figure 8:
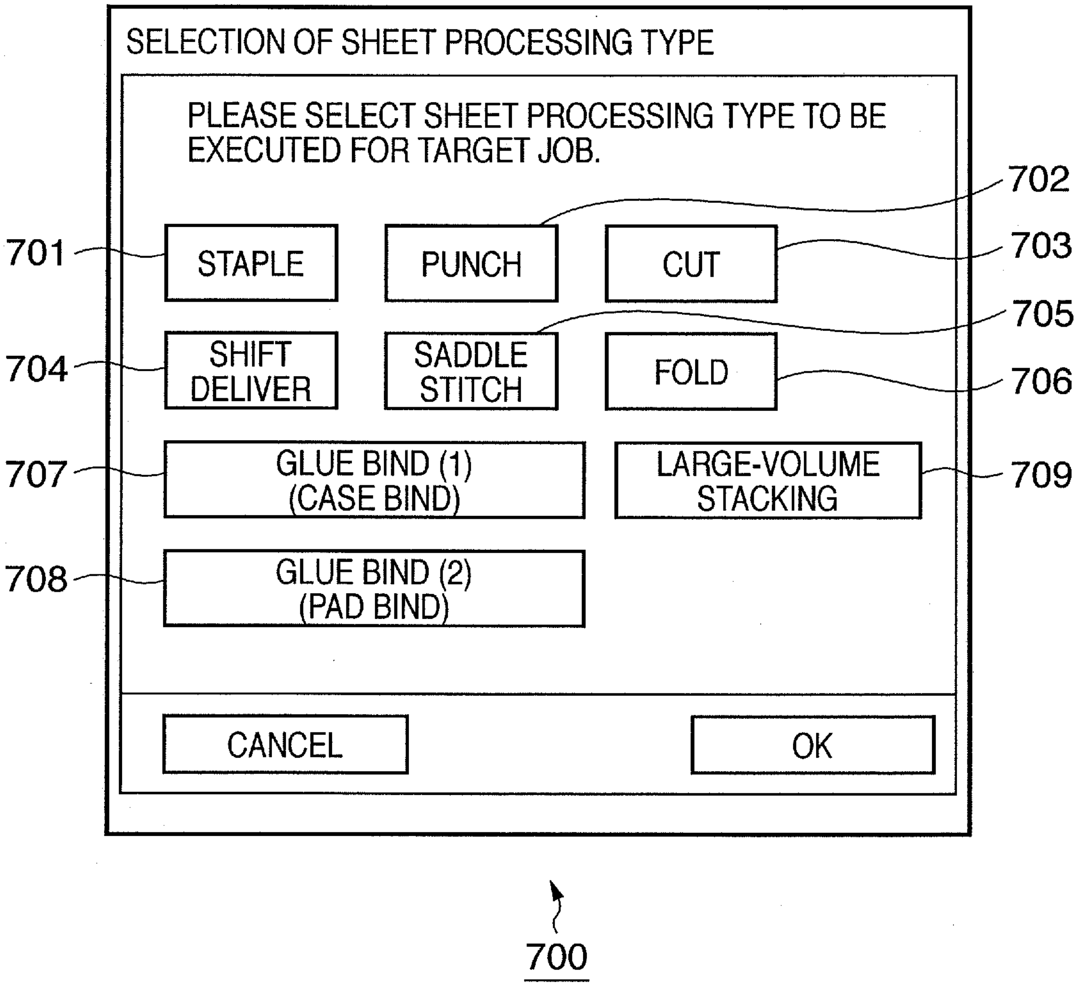
FIG. 8 is a view showing an example of a window to select a sheet processing type.

FIG. 8 shows a setup window for prompting the user to select the type of sheet processing to be executed for sheets printed by the printing apparatus 100. When the user presses a sheet processing setting key 510 in FIG. 7 displayed in the window on the touch panel unit 401, the control unit 205 causes the touch panel unit 401 to display the window in FIG. 8. This window is a setup window which allows the user to select the type of sheet processing executable by the sheet processing apparatus 200 present in the printing system 1000. For example, the user can select staple 701, punch 702, cut 703, shift delivery 704, saddle stitch 705, fold 706, glue bind (case bind) 707, glue bind (pad bind) 708, and large-volume stacking 709. The control unit 205 accepts, from the user via this setup window, settings of sheet processing to be executed for a target job, and causes the sheet processing apparatus 200 to execute the sheet processing according to the settings.

Figure 9:
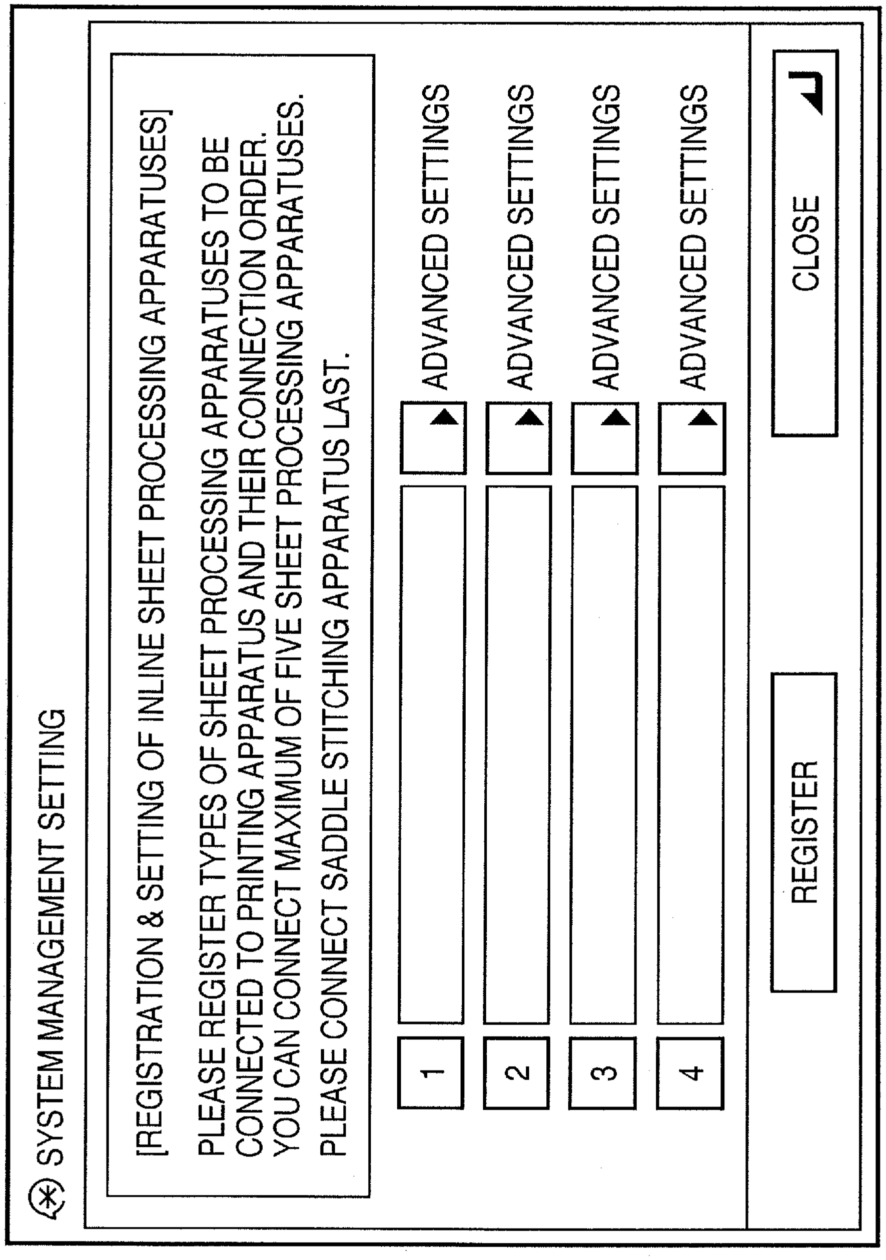
FIG. 9 is a view showing an example of a window to register and set a sheet processing apparatus.

A window shown in FIG. 9 is a setup window which allows the user to register information for specifying the number, types, and connection order of sheet processing apparatuses when the sheet processing apparatuses 200 are connected to the printing apparatus 100. When the user presses the user mode key 505, the control unit 205 causes the touch panel unit 401 to display the window shown in FIG. 9.

For example, when the printing system 1000 has the system configuration as shown in FIG. 3, the user sets, in the window of FIG. 9, registration information that three sheet processing apparatuses, that is, the large-volume stacker, glue binding apparatus, and saddle stitching apparatus are connected to the printing apparatus 100 sequentially from the large-volume stacker. The control unit 205 causes the RAM 208 to hold, as system configuration information, the information on the sheet processing apparatuses 200 that is set by the user via the window in FIG. 9. The control unit 205 properly reads out and refers to the system configuration information. From the system configuration information, the control unit 205 confirms the number and connection order of sheet processing apparatuses connected to the printing apparatus 100, and sheet processing types executable by the sheet processing apparatuses.

When the user makes a setting in the window of FIG. 9 to connect the saddle stitching apparatus having no straight path between sheet processing apparatuses, the control unit 205 causes the touch panel unit 401 to present an error display in order to invalidate the setting. Further, as shown in FIG. 9, the control unit 205 causes the touch panel unit 401 to display guidance information and notify the user of cancellation of this setting and connection of the saddle stitching apparatus last.

The embodiment exemplifies the operation unit 204 of the printing apparatus 100 as an example of a user interface unit applied to the printing system 1000, but another user interface unit is also available. For example, the printing system 1000 is configured to be able to execute processing based on an instruction from the user interface unit of an external apparatus such as the PC 103 or PC 104.

Figure 10:
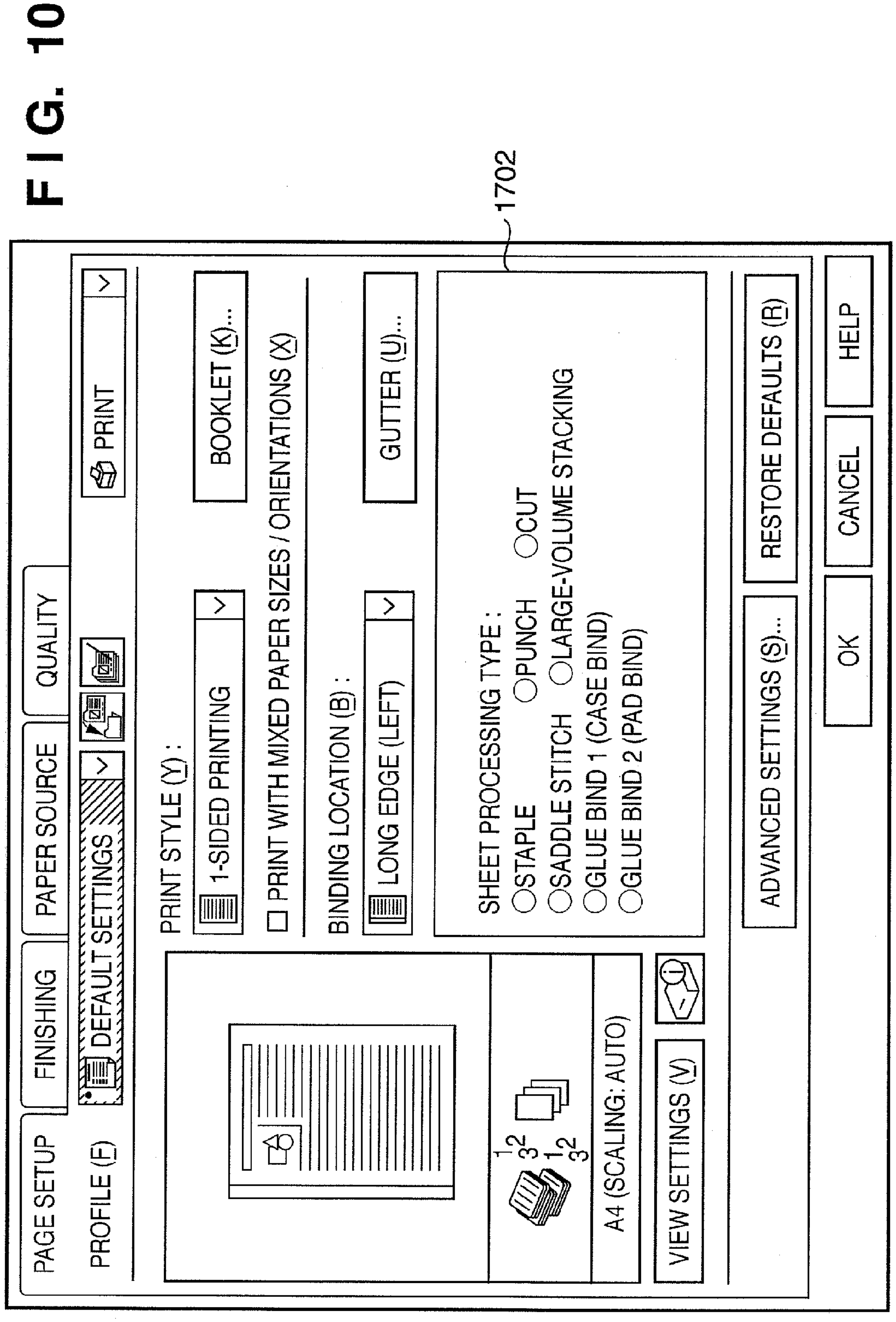
FIG. 10 is a view showing an example of a window to select a sheet processing type on the display unit of a computer.

When the external apparatus remote-controls the printing system 1000, the display unit of the external apparatus displays a setup window relevant to the printing system 1000, as shown in FIG. 10. This will be exemplified using the PC 104. FIG. 10 shows an example of a window on the display of the PC 104.

Upon accepting a print request from the user, the CPU of the PC 104 causes the display to present the window as shown in FIG. 10. The CPU accepts the settings of print processing conditions from the user of the PC 104 via the window. For example, the CPU of the PC 104 accepts, from the user via a setting field 1702, the type of sheet processing to be executed by the sheet processing apparatus 200 for a print job for which the PC 104 issues a print execution request. Upon accepting the print execution request in response to the pressing of an OK key shown in FIG. 10, the CPU of the PC 104 associates the print processing conditions accepted via the window with image data to be printed. The CPU of the PC 104 controls to transmit the resultant data as one job to the printing system 1000 via the network 101.

In the printing system 1000, upon accepting the print execution request of the job via the external I/F 202, the control unit 205 controls the printing system 1000 to process the job from the PC 104 based on the print processing conditions from the PC 104.

An "RWP mode" and "RAP mode" as operation modes in the embodiment will be explained. The "RWP mode" stands for RIP (Raster Image Processing)-WHILE-PRINT-MODE. The control unit 205 controls the printer unit 203 to print rasterized print data (raster image data) on a print medium without waiting for rasterizing the final page of a target job into print data.

The "RAP mode" stands for RIP (Raster Image Processing)-AFTER-PRINT-MODE. The control unit 205 controls the printer unit 203 to print rasterized rendering data on a print medium after rasterizing the final page of a target job into print data.

The printing apparatus 100 receives a PDF (Portable Document Format) file or PDL (Page Description Language) data via the network 101. The control unit 205 analyzes the received data to be printed, and rasterizes the data into a bitmap image (synonymous with raster image data) on the basis of the analysis result.

Control examples of printing a print job by switching the operation mode in accordance with the environment of the printing system 1000 will be explained with reference to FIGS. 11 to 16.

FIRST CONTROL EXAMPLE IN PRINTING SYSTEM 1000

Figure 11:
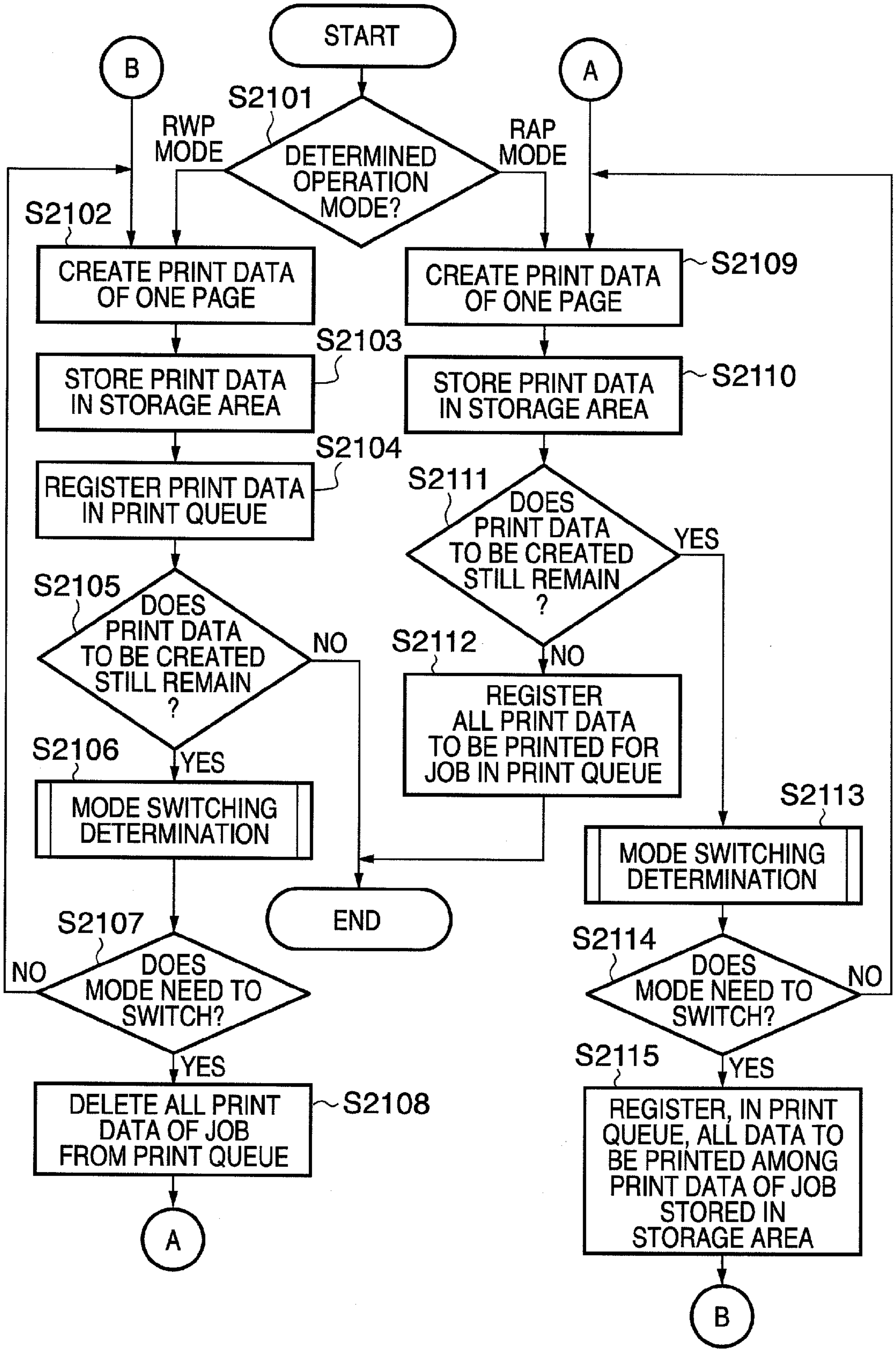
FIG. 11 is a flowchart showing processing when creating print data in the first control example.

FIG. 11 is a flowchart showing processing when creating print data in the first control example. The control unit 205 of the printing apparatus 100 executes this processing for each target job.

When the user issues a print execution request for a target job via the UI unit, the control unit 205 determines in step S2101 which of the RWP mode and RAP mode is adopted to process the print execution-requested job.

The print execution request of the target job is issued after either the RAP mode or RWP mode is designated. In this case, the control unit 205 causes the printing system 1000 to process the job in the designated operation mode.

If no operation mode is designated for the target job, the control unit 205 causes the printing system 1000 to process the job in an operation mode set as an initial setting of the printing system 1000 out of the two operation modes.

If the printing system 1000 operates in the RWP mode, the control unit 205 creates print data of one page in step S2102. In step S2103, the control unit 205 stores the created print data in the storage area (HD 209). In step S2104, the control unit 205 registers the print data in the print queue. The print queue manages the output order of queued images, and is used for processing such as change of the print order of jobs, overtaking printing, or multiple-copy output.

After the end of registration in step S2104, the control unit 205 determines in step S2105 whether the job still has print data to be created. If the control unit 205 determines that the job does not have any print data to be created, the process ends. If the job still has print data to be created, the control unit 205 determines, in step S2106 on the basis of the number of queued data, whether the operation mode needs to switch.

If the number of print data registered in the print queue is smaller than a predetermined value, the control unit 205 determines that the engine may stop during printing of a job because creation of print data does not catch up with printing, and that the operation mode needs to switch to the RAP mode. In this determination, the control unit 205 may predict the time necessary to create the next print data. If the control unit 205 predicts that creation of print data takes a long time, it may determine that the operation mode needs to switch. If the operation mode switches to the RAP mode with a small remaining capacity of the storage area (HD 209), the storage area readily runs short. Thus, when the remaining capacity of the storage area is small, the control unit 205 may determine that the operation mode does not switch to the RAP mode.

If the control unit 205 determines in step S2107 that the mode need not switch, it returns to step S2102 to repeat the above-described process. If the control unit 205 determines that the mode needs to switch, it deletes all the print data of jobs registered in the print queue from the queue in step S2108, as a preparation to shift to the RAP mode.

If the operation mode is the RAP mode in step S2101, or the process advances from step S2108, the control unit 205 creates print data of one page in step S2109. In step S2110, the control unit 205 stores the created print data in the storage area (HD 209). In step S2111, the control unit 205 determines whether the job still has print data to be created. If the control unit 205 determines that the job does not have any print data to be created, it determines that all the print data of the job have been created, and registers all the print data to be printed in the print queue in step S2112.

In registration processing, print data, which has already been printed when the printing system 1000 operates in the RWP mode, and need not be printed, is not registered in the print queue. Upon completion of registration in the print queue, the process ends.

If the job still has print data to be created in step S2111, the control unit 205 determines, in step S2113 on the basis of the number of queued data, whether the operation mode needs to switch. For example, when the number of print data registered in the print queue is larger than a predetermined value, the control unit 205 determines that the engine hardly stops during printing of a job without creation of print data becoming late even if the printing system 1000 operates in the RWP mode. The control unit 205, therefore, determines that the operation mode needs to switch to the RWP mode. In this determination, if there are a plurality of print jobs, the control unit 205 may determine that the operation mode needs to switch to the RWP mode in order to quickly process the job and execute printing of another print job. When the remaining capacity of the storage area (HD 209) is small, the storage area readily runs short. In this case, the control unit 205 may determine that the operation mode needs to switch to the RWP mode.

If the control unit 205 determines in step S2114 that the mode need not switch, it returns to step S2109 to repeat the above-described process. If the control unit 205 determines that the mode needs to switch, it registers all print data to be printed for the job in the print queue in step S2115, as a preparation to shift to the RWP mode.

In registration processing, print data, which has already been printed when the printing system 1000 operates in the RWP mode, and need not be printed, is not registered in the print queue. Upon completion of registration in the print queue, the control unit 205 starts the RWP mode in step S2102.

By properly automatically selecting the RWP mode and RAP mode during job processing, the printing system 1000 can run by an optimum operation without bothering the user.

Figure 12:
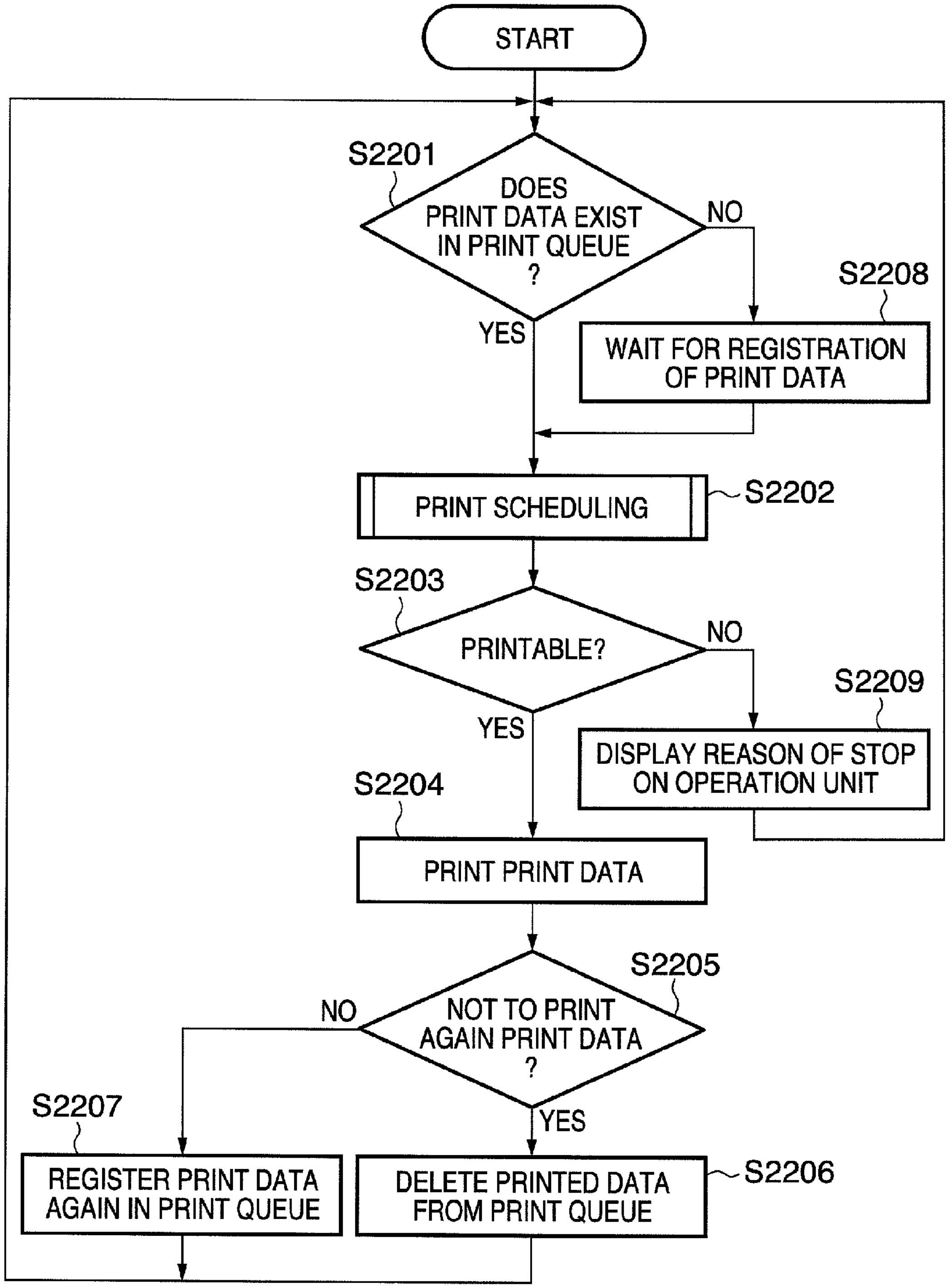
FIG. 12 is a flowchart showing processing for print data based on the print queue.

FIG. 12 is a flowchart showing processing for print data based on the print queue. This processing starts after activating the printer unit 203, and performs printing while scheduling print data registered in the print queue for an optimum operation.

In step S2201, the control unit 205 monitors the status of the print queue. If no print data exists in the print queue, the control unit 205 stops the printer engine in step S2208, and waits until print data is registered in the print queue. If print data exists in step S2201, the process advances to step S2202. If print data is registered in step S2208, the control unit 205 activates the printer engine, and advances to step S2202.

In step S2202, the control unit 205 schedules the print order in order to execute optimum print processing. The control unit 205 schedules the print order and changes the order of print data registered in the print queue in consideration of the following points:

- change of the order based on job priority
- overtaking of a job based on output tray settings
- overtaking of a job due to suspension such as the absence of paper In step S2203, the control unit 205 checks whether the first print data in the print queue is printable. If the printer engine stops due to a door open state, jam, or the like, or printing is impossible due to the absence of paper as a result of the check, no print data is printable at present. In step S2209, the control unit 205 displays the reason of the print failure on the operation unit 204. The control unit 205 returns to step S2201 to repeat the above-mentioned processing.

If printing is possible in step S2203, the control unit 205 prints the first print data in the print queue in step S2204. In step S2205, the control unit 205 determines whether to print again the data printed in step S2204. If no printed data is printed again, the control unit 205 deletes the printed data from the print queue in step S2206. When output of a plurality of copies or the like is set in the print queue and print data is to be printed again, the control unit 205 moves print data in the print queue to a reprint position in step S2207.

As described above, the first control example can obtain especially an effect capable of printing in an optimum order, in addition to effects disclosed in the embodiment.

SECOND CONTROL EXAMPLE IN PRINTING SYSTEM 1000

A control example of processing to change the number of output copies when switching from the RAP mode to the RWP mode will be described in detail as the second control example executed by the control unit 205.

Figure 13:
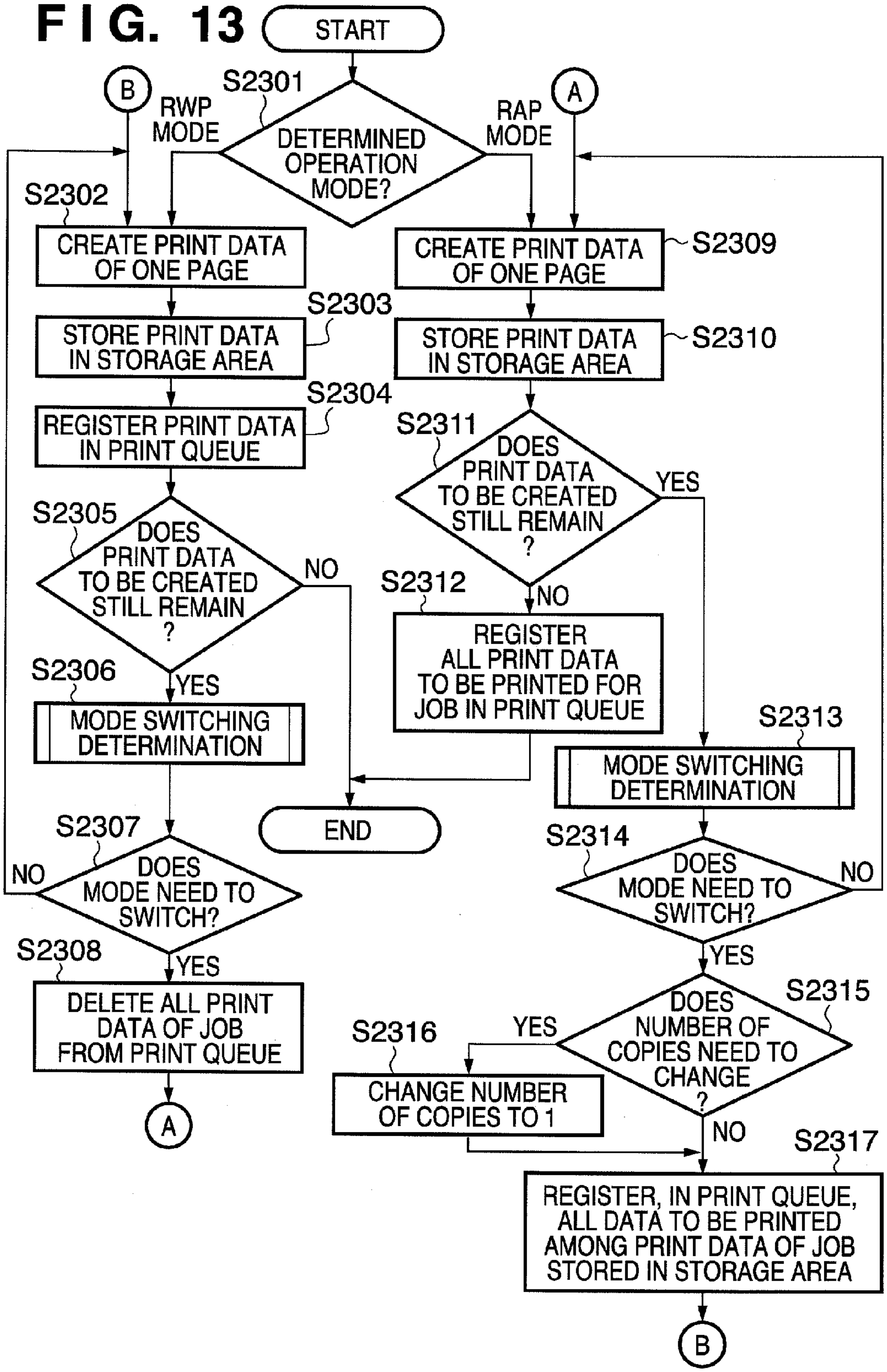
FIG. 13 is a flowchart showing processing when creating print data in the second control example.

FIG. 13 is a flowchart showing processing when creating print data in the second control example. In the second control example, processes in S2315 and S2316 are further added to S2301 to S2314 and S2317 corresponding to S2101 to S2115 in the first control example of FIG. 11.

More specifically, if the mode needs to switch from the RAP mode to the RWP mode in step S2314, the control unit 205 determines in step S2315 whether the number of copies of a job needs to change. Assume that the number of output copies of the job in process is two or more, and it is determined that the mode needs to switch owing to shortage of the capacity of the storage area. In this case, the control unit 205 determines that the number of copies of a job needs to change because even switching to the RWP mode does not cancel shortage of the storage capacity.

Assume that the number of output copies (number of copies set as a total number of copies by the user for a target job) is one. In this case, the control unit 205 controls the print queue to automatically delete printed data from the memory every time each page is printed. This control is also a mechanism capable of increasing the remaining capacity of the storage area. On the premise of this configuration, assume that a print execution-requested job is a job requiring printing by a specific number of copies, i.e., one copy as a total number of copies. In this case, the control unit 205 determines that the number of output copies need not change on condition that the target job is a job requiring printing by a specific number of copies, i.e., one copy, as described above.

If the control unit 205 determines in step S2315 that the number of output copies needs to change, it changes the number of output copies to one in step S2316. In step S2317, the control unit 205 registers all print data to be printed for the job in the print queue, as a preparation to shift to the RWP mode.

In registration processing, print data, which has already been printed when the printing system 1000 operates in the RWP mode, and need not be printed, is not registered in the print queue. Upon completion of registration in the print queue, the operation mode shifts to the RWP mode.

In the second control example based on the first control example, the control unit 205 controls the print queue to change the number of output copies when switching the operation mode from the RAP mode to the RWP mode.

In addition to effects disclosed in the embodiment, the second control example can avoid, as much as possible, problems which may arise due to, e.g., shortage of the free capacity of the storage area of the memory unit which holds data rasterized into a bitmap image. For example, the second control example can prevent a problem of canceling printing of a print execution-requested job owing to the above-mentioned reason. Moreover, the second control example can automatically continue output of the job.

THIRD CONTROL EXAMPLE IN PRINTING SYSTEM 1000

A control example of processing to adjust the print interval will be described in detail as the third control example executed by the control unit 205. The third control example minimizes the generation frequency at which the printer unit 203 stops during printing in wait for print data.

Figure 14:
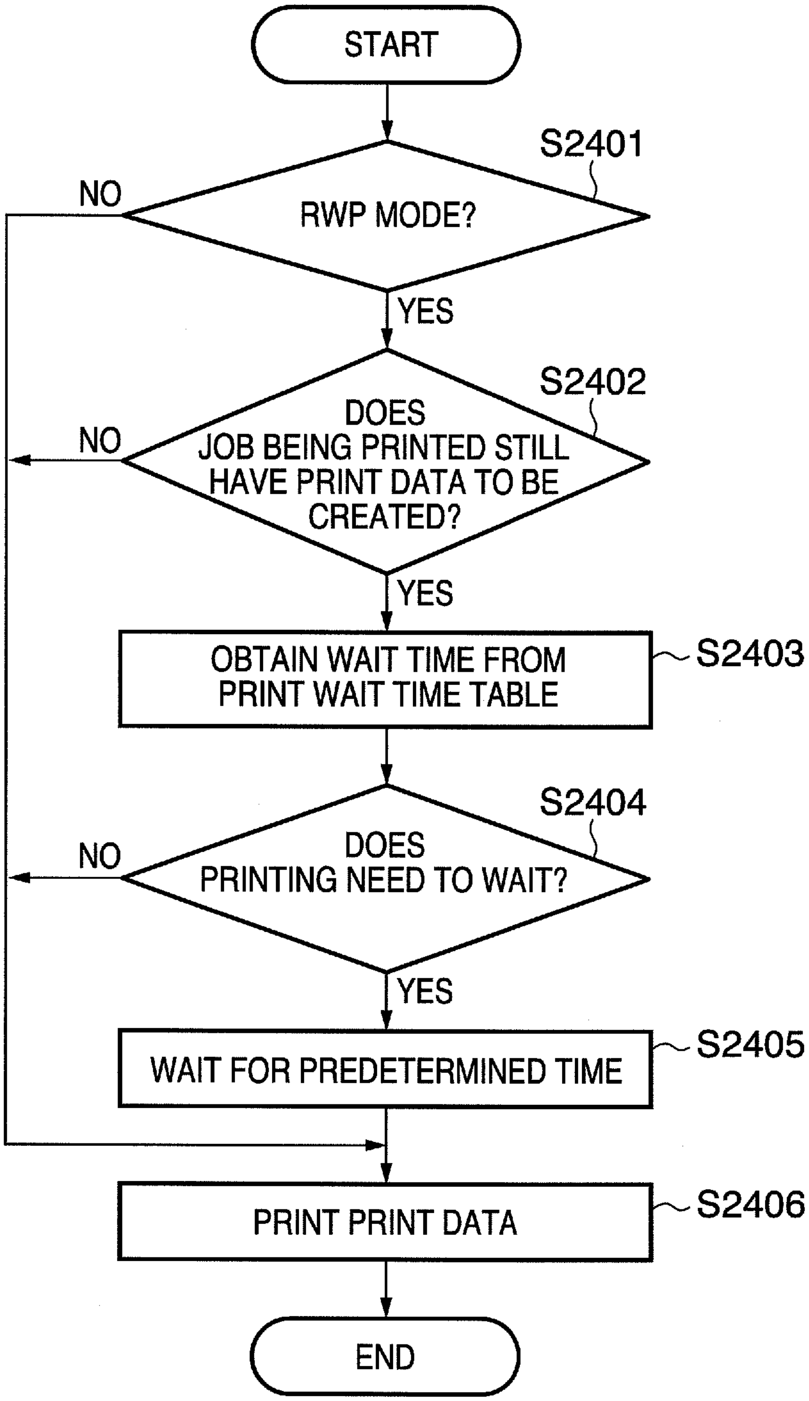
FIG. 14 is a flowchart showing processing which corresponds to processing executed by a control unit 205 and is to control not to stop a printer unit 203 after waiting a predetermined time based a print wait time table.

FIG. 14 is a flowchart showing processing to control not to stop the printer unit 203 after waiting a predetermined time based on a print wait time table. This processing corresponds to processing executed by the control unit 205.

In step S2401, the control unit 205 determines the operation mode. If the printing system 1000 operates in the RWP mode, the control unit 205 checks in step S2402 whether the job in process still has print data to be created. If the job still has print data to be created, printing of the job may stop in wait for print data. In this case, the control unit 205 calculates the wait time from a print wait time table shown in FIG. 15 or 16 in step S2403.

FIG. 15 shows an example of a print wait time table based on the number of feed-waiting data that is adopted by the control unit 205 in the third control example. The table shown in FIG. 15 holds information used to control the printer unit 203 by the control unit 205 so as not to stop the printer unit 203 during printing in wait for print data. More specifically, the table shown in FIG. 15 holds information representing a wait time corresponding to the number of feed-waiting data. In this example, time information is set such that the wait time is 0 sec when the number of feed-waiting data corresponds to four or more pages, and the wait time becomes longer as the number of pages decreases. In other words, information representing a wait time which hardly causes a wait for print data is registered.

FIG. 16 shows a print wait time table based on the print delivery location. As shown in FIG. 16, the table holds a wait addition time to be added to the wait time in FIG. 15 in accordance with the print delivery location because the paper path becomes long depending on the print delivery location. In this example, the wait addition time is set to 0 sec in the absence of any inline finisher, and becomes longer in the order of a large-volume stacker, glue binding apparatus, and saddle stitching apparatus.

In step S2404, the control unit 205 determines, from the wait time obtained in step S2403, whether printing needs to wait. Printing needs to wait unless the wait time is 0 sec. Thus, in step S2405, the control unit 205 delays the start of printing for the wait time obtained in step S2403. The control unit 205 can execute this control for the printer unit 203.

If the mode is the RAP mode in step S2401, no data exists in step S2402, or no wait time is necessary in step S2404, the control unit 205 advances to step S2406.

In step S2406, the control unit 205 prints the print data, and the process ends.

In addition to the above-described configuration, the printing system 1000 may be configured to be able to adjust the print interval, like a constituent feature illustrated in the third control example. In particular, this configuration can also decrease the generation frequency at which the printer unit 203 stops during printing in wait for print data.

Switching between the RAP and RWP modes is not limited to the aforementioned control examples, and is also applicable to the following case.

For example, a job requiring printing of PDL data is acceptable as a target job. A job of a data format such as the PDF file format different from the PDL format is also acceptable. In this manner, the printing system 1000 is configured to be able to accept a plurality of types of jobs. On the premise of these configurations, the printing system pays attention to a situation in which rasterization of print data of a job into a bitmap image takes a long time when the target job is a job requiring printing of print data in the PDF file format.

When the operation mode is the RWP mode and a print execution-requested job is a job requiring printing of PDF data, the control unit 205 controls the printer unit 203 to switch to the RAP mode.

On the premise of the configuration disclosed above, the printing system 1000 may comprise the following constituent feature. For example, the control unit 205 controls to automatically switch between the RAP mode and the RWP mode in accordance with the number of jobs in process. The number of jobs in process is the number of queued jobs registered in the print queue upon receiving print execution requests. Assume that the next job is input while the printing system 1000 operates to process the first job among print jobs in the RAP mode. In this case, the control unit 205 controls to switch the operation mode of the first job from the RAP mode to the RWP mode and continue processing of the first job in the RWP mode.

On the premise of the configuration disclosed above, the printing system 1000 may comprise the following constituent feature. For example, the control unit 205 controls to automatically switch between the RAP mode and the RWP mode in accordance with the type of communication path for accepting print data of a print execution-requested job. Assume that the target job is a job input via a specific type of data input path such as a narrow-band USB or Centronics interface. In this case, the control unit 205 controls to process the job in the RAP mode. To the contrary, when the target job is a job input via a data input path of a type different from the specific type of data input path, the control unit 205 controls to process the job in the RWP mode.

In this fashion, the printing system 1000 may comprise various configurations as mechanisms of flexibly using the RWP mode and RAP mode disclosed in the embodiment.

According to the above-described control examples, both the first effect by the RWP mode and the second effect by the RAP mode can be achieved by controlling to be able to selectively execute both the RWP mode and RAP mode.

[First Effect]

For example, since the RWP mode is available, printing can start without waiting for the completion of rasterizing print data of the final page when the target job is a job requiring print processing of print data of pages. Processing a job in this mode can shorten the time required to start printing of print data of the job upon accepting a request to print the job. A "mechanism specialized in the productivity of one print job", which receives attention in the embodiment as one of prospective important requests in a printing environment such as the POD environment, can be attained.

[Second Effect]

For example, since the RAP mode is available, printing by the printer engine can stand by till the completion of rasterizing print data of the final page even when the print job is a job containing pages whose print data take a long time for rasterization processing. In other words, immediately after print data of the final page is rasterized, data is supplied to the printer engine, and printing of the job can be completed without stopping the print operation of the printer engine. The printing system can prevent a situation in which the print operation of the printer engine frequently stops during printing of one job. A "mechanism considering the productivity of all print jobs", which receives attention in the embodiment as one of prospective important requests in a printing environment such as the POD environment, can be attained.

[Other Mechanisms]

A computer (e.g., the PC 103 or 104) may achieve the functions shown in the drawings in the embodiment in accordance with an externally installed program. In this case, data for displaying the same operation windows as those described in the embodiment including operation windows are externally installed to provide various user interface windows on the display of the computer. For example, this has been described with reference to a configuration based on the UI window shown in FIG. 10. In this configuration, the present invention is also applicable to a case where pieces of information including a program are supplied to an output apparatus from a storage medium such as a CD-ROM, flash memory, or FD, or from an external storage medium via a network.

As described above, a storage medium which records software program codes for implementing the functions of the above-described embodiment is supplied to a system or apparatus. The computer (CPU or MPU) of the system or apparatus reads out and executes the program codes stored in the storage medium, achieving the object of the present invention. In this case, the program codes read out from the storage medium implement new functions of the present invention, and the storage medium which stores the program codes constitutes the present invention.

The program form is arbitrary such as an object code, a program executed by an interpreter, or script data supplied to an OS as long as a program function is attained.

The storage medium for supplying the program includes a flexible disk, hard disk, optical disk, magnetooptical disk, MO, CD-ROM, CD-R, CD-RW, magnetic tape, nonvolatile memory card, ROM, and DVD. In this case, the program codes read out from the storage medium implement the functions of the above-described embodiment, and the storage medium which stores the program codes constitutes the present invention.

As another program supply method, a client computer connects to an Internet homepage via the browser of the client computer. Then, the computer program of the present invention or a compressed file containing an automatic installing function is downloaded from the homepage to a recording medium such as a hard disk, thereby supplying the program. The program can also be implemented by grouping program codes which form the program of the present invention into a plurality of files, and downloading the files from different homepages. That is, claims of the present invention also incorporate a WWW server, FTP server, and the like which prompt a plurality of users to download the program files for implementing functional processes of the present invention by a computer.

The program of the present invention can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the embodiment are implemented when the computer executes the readout program codes. Also, the functions of the embodiment are implemented when an OS (Operating System) or the like running on the computer performs some or all of actual processes on the basis of the instructions of the program codes.

The program codes read out from the storage medium may be written in the memory of a function expansion board inserted into the computer or the memory of a function expansion unit connected to the computer. After that, the CPU of the function expansion board or function expansion unit performs some or all of actual processes on the basis of the instructions of the program codes. These processes also implement the functions of the above-described embodiment.

The present invention may be applied to a system including a plurality of devices or an apparatus formed by a single device. The present invention can also be achieved by supplying a program to the system or apparatus. In this case, the system or apparatus can obtain the effects of the present invention by providing, to the system or apparatus, a storage medium which stores a program represented by software for achieving the present invention.

The present invention is not limited to the above-described embodiment, and various modifications (including organic combinations of embodiments) can be made without departing from the gist of the invention, and are not excluded from the scope of the invention. For example, in the embodiment, the control unit 205 in the printing apparatus 100 serves as a main controller for various control operations. Instead, an external controller in a housing different from the printing apparatus 100 may also execute some or all of various control operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-229854, filed Aug. 25, 2006, which is hereby incorporated by reference herein in its entirety.

What is claimed is:

1. A printing apparatus comprising:

a rasterization unit that rasterizes data of a print job into raster image data;

a storage unit that stores the raster image data of the print job;

a print unit that prints an image on a sheet using the raster image data of the print job stored in the storage unit;

a setting unit that sets a raster-image processing while-print mode in which the print unit starts printing using raster image data before the rasterization unit completes rasterization processing of data of the print job, or a raster-image processing after-print mode in which the print unit starts printing using raster image data after the rasterization unit has completed rasterization processing of the data of the print job;

a control unit that controls the print unit, in a case where the print job is set to the raster-image processing after-print mode, to execute the printing of the print job by:

switching the print mode of the print job to the raster-image processing while-print mode, in a case where a remaining capacity of the storage unit is smaller than a predetermined capacity, and maintaining the print mode of the print job in the raster-image processing after-print mode, in a case where the remaining capacity of the storage unit is larger than the predetermined capacity; and a determination unit that, in a case where two or more number of copies is designated as the number of copies of the print job:

determines the number of copies to be one in a case where the control unit controls the print unit to execute the printing in the raster-image processing while-print mode, and determines the number of copies to be two or more copies in a case where the control unit controls the print unit to execute the printing in the raster-image processing after-print mode.

2. The apparatus according to claim 1, wherein the setting unit sets the raster-image processing while-print mode or the raster-image processing after-print mode before the rasterization unit starts the rasterization processing of the data of the print job.

3. The apparatus according to claim 1, wherein the control unit detects the remaining capacity of the storage unit after the rasterization unit has completed the rasterization processing of the data of the print job.

4. The apparatus according to claim 1, wherein the predetermined capacity is a capacity necessary to store all raster image data of the print job.

5. The apparatus according to claim 1, further comprising a deletion unit that deletes raster image data printed by the print unit from the storage unit in a case where the raster image data printed by the print unit is not raster image data to be printed again.

6. A control method of a printing apparatus, the method comprising the steps of:

rasterizing data of a print job into raster image data;

storing the raster image data of the print job in a storage unit;

printing an image on a sheet using the raster image data of the print job stored in the storage unit in the storing step;

setting a raster-image processing while-print mode in which the print unit starts printing using raster image data before rasterization processing of data of the print job is completed in the rasterizing step, or a raster-image processing after-print mode in which the print unit starts printing using raster image data after rasterization processing of the data of the print job has been completed in the rasterizing step;

controlling the printing step to execute the printing of the print job, in a case where the print job is set to the raster-image processing after-print mode by:

switching the printing mode of the print job to the raster-image processing while-print mode, in a case where a remaining capacity of the storage unit is smaller than a predetermined capacity, and maintaining the print mode of the print job in the raster-image processing after-print mode, in a case where the remaining capacity of the storage unit is larger than the predetermined capacity; and determining the number of copies to be, in a case where two or more number of copies is designated as the number of copies of the print job:

one in a case where the control unit controls the print unit to execute the printing in the raster-image processing while-print mode, and two or more copies in a case where the control unit controls the print unit to execute the printing in the raster-image processing after-print mode.

7. A non-transitory computer-readable recording medium storing a computer program executable by a computer to execute a control method of a printing apparatus, the method comprising the steps of:

rasterizing data of a print job into raster image data;

storing the raster image data of the print job in a storage unit;

printing an image on a sheet using the raster image data of the print job stored in the storage unit in the storing step;

setting a raster-image processing while-print mode in which the print unit starts printing using raster image data before rasterization processing of data of the print job is completed in the rasterizing step, or a raster-image processing after-print mode in which the print unit starts printing using raster image data after rasterization processing of the data of the print job has been completed in the rasterizing step;

controlling the printing step to execute the printing of the print job, in a case where the print job is set to the raster-image processing after-print mode by:

switching the printing mode of the print job to the raster-image processing while-print mode, in a case where a remaining capacity of the storage unit is smaller than a predetermined capacity, and maintaining the print mode of the print job in the raster-image processing after-print mode, in a case where the remaining capacity of the storage unit is larger than the predetermined capacity; and determining the number of copies to be, in a case where two or more number of copies is designated as the number of copies of the print job:

one in a case where the control unit controls the print unit to execute the printing in the raster-image processing while-print mode, and two or more copies in a case where the control unit controls the print unit to execute the printing in the raster-image processing after-print mode.

* * * * *